United States Patent
Stoll et al.

(10) Patent No.: US 9,415,712 B2
(45) Date of Patent: Aug. 16, 2016

(54) VENTILATION SYSTEM

(71) Applicant: GENTHERM GMBH, Odelzhausen (DE)

(72) Inventors: Andreas Stoll, Unterfohring (DE); Jonathan Zhang, Tianjin (CN); Thomas Fries, Shanghai (CN); Eric (Tong) Yu, Langfang (CN); Denise Philipp, Dachau (DE)

(73) Assignee: GENTHERM GMBH, Odelzhausen (DE)

( * ) Notice: Subject to any disclaimer, the term of this patent is extended or adjusted under 35 U.S.C. 154(b) by 0 days.

(21) Appl. No.: 14/301,655

(22) Filed: Jun. 11, 2014

(65) Prior Publication Data

US 2014/0333101 A1 Nov. 13, 2014

Related U.S. Application Data

(63) Continuation of application No. 12/642,991, filed on Dec. 21, 2009, now Pat. No. 8,777,320.

(30) Foreign Application Priority Data

| Dec. 21, 2008 | (DE) | ........................ 10 2008 063 833 |
| Feb. 16, 2009 | (DE) | .................... 20 2009 002 177 U |
| Feb. 19, 2009 | (DE) | ........................ 10 2009 009 574 |
| Jul. 14, 2009 | (DE) | .................... 20 2009 009 686 U |
| Sep. 21, 2009 | (DE) | ........................ 10 2009 042 096 |
| Dec. 7, 2009  | (DE) | ........................ 10 2009 056 952 |

(51) Int. Cl.
*B60N 2/56* (2006.01)
*B60H 1/00* (2006.01)
*B60N 2/00* (2006.01)

(52) U.S. Cl.
CPC .......... *B60N 2/5621* (2013.01); *B60H 1/00285* (2013.01); *B60N 2/565* (2013.01);
(Continued)

(58) Field of Classification Search
None
See application file for complete search history.

(56) References Cited

U.S. PATENT DOCUMENTS

| 374,424 A | 12/1887 | Ober |
| 390,154 A | 9/1888  | Beach |

(Continued)

FOREIGN PATENT DOCUMENTS

| CA | 1266925 A1 | 3/1990 |
| CA | 2393970 A1 | 6/2001 |

(Continued)

OTHER PUBLICATIONS

Automotive Heated Seats—Heated Steering Wheels, IGB Automotive Ltd., received by Assignee W.E.T. Automotive Systems; dated May 2003.

(Continued)

*Primary Examiner* — Gregory Huson
*Assistant Examiner* — Eric Gorman
(74) *Attorney, Agent, or Firm* — The Dobrusin Law Firm, P.C.

(57) ABSTRACT

The present invention is drawn to a ventilation system for a "climate object", in particular all components with which the user of a vehicle may come in contact in a passenger compartment such as, for example, a steering mechanism for a vehicle, a dashboard, an armrest, a door paneling, a seat cover, a heating blanket, a padding, a cover or a seat, all which include at least one air flow device to guide air through the climate object.

20 Claims, 14 Drawing Sheets

(52) U.S. Cl.
CPC ........... *B60N 2/5628* (2013.01); *B60N 2/5635* (2013.01); *B60N 2/5657* (2013.01); *B60N 2/5685* (2013.01); *B60H 2001/003* (2013.01); *Y10T 74/20256* (2015.01)

(56) References Cited

U.S. PATENT DOCUMENTS

| | | | |
|---|---|---|---|
| 1,369,732 A | 3/1921 | Mollberg | |
| 1,439,681 A | 12/1922 | Alkire et al. | |
| 1,475,912 A | 11/1923 | Williams | |
| 1,514,329 A | 11/1924 | Metcalf | |
| 1,537,460 A | 5/1925 | Campbell et al. | |
| 1,541,213 A | 6/1925 | Harley | |
| 1,593,066 A | 7/1926 | Gaston | |
| 1,664,636 A | 4/1928 | Mayer | |
| 1,837,515 A | 12/1931 | Bachrach | |
| 1,936,960 A | 11/1933 | Bowman | |
| 2,022,959 A | 12/1935 | Gordon | |
| 2,103,553 A | 12/1937 | Reynolds | |
| 2,158,801 A | 5/1939 | Petterson | |
| 2,236,475 A * | 3/1941 | Findley | B60H 1/00464 126/110 B |
| 2,336,089 A | 12/1943 | Gould | |
| 2,493,303 A | 1/1950 | McCullough | |
| 2,544,506 A | 3/1951 | Kronhaus | |
| 2,703,134 A | 3/1955 | Mossor | |
| 2,749,906 A | 6/1956 | O'Connor | |
| 2,758,532 A | 8/1956 | Awe | |
| 2,782,834 A | 2/1957 | Vigo | |
| 2,791,956 A | 5/1957 | Guest | |
| 2,826,135 A | 3/1958 | Benzick | |
| 2,912,832 A | 11/1959 | Clark | |
| 2,931,286 A | 4/1960 | Fry, Sr. et al. | |
| 2,976,700 A | 3/1961 | Jackson | |
| 2,978,972 A | 4/1961 | Hake | |
| 2,992,604 A * | 7/1961 | Trotman et al. | 454/120 |
| 2,992,605 A | 7/1961 | Trotman et al. | |
| 3,030,145 A | 4/1962 | Kottemann | |
| 3,101,037 A | 8/1963 | Taylor | |
| 3,101,660 A | 8/1963 | Taylor | |
| 3,120,006 A | 2/1964 | Knappe | |
| 3,127,931 A | 4/1964 | Johnson | |
| 3,131,967 A | 5/1964 | Spaulding | |
| 3,136,577 A | 6/1964 | Richard | |
| 3,137,523 A | 6/1964 | Karner | |
| 3,162,489 A | 12/1964 | Trotman | |
| 3,209,380 A | 10/1965 | Watsky | |
| 3,486,177 A | 12/1969 | Marshack | |
| 3,529,310 A | 9/1970 | Olmo | |
| 3,550,523 A | 12/1970 | Segal | |
| 3,552,133 A | 1/1971 | Lukomsky | |
| 3,628,829 A | 12/1971 | Hellig | |
| 3,638,255 A | 2/1972 | Sterrett | |
| 3,653,589 A | 4/1972 | McGrath | |
| 3,653,590 A | 4/1972 | Elsea | |
| 3,681,797 A | 8/1972 | Messner | |
| 3,684,170 A | 8/1972 | Roof | |
| 3,732,944 A | 5/1973 | Kendall | |
| 3,736,022 A | 5/1973 | Radke | |
| 3,738,702 A | 6/1973 | Jacobs | |
| 3,757,366 A | 9/1973 | Sacher | |
| 3,770,318 A | 11/1973 | Fenton | |
| 3,778,851 A | 12/1973 | Howorth | |
| 3,948,246 A | 4/1976 | Jenkins | |
| 4,002,108 A | 1/1977 | Drori | |
| 4,043,544 A | 8/1977 | Ismer | |
| 4,044,221 A | 8/1977 | Kuhn | |
| 4,060,276 A | 11/1977 | Lindsay | |
| 4,065,936 A | 1/1978 | Fenton et al. | |
| 4,072,344 A | 2/1978 | Li | |
| 4,141,585 A | 2/1979 | Blackman | |
| 4,175,297 A | 11/1979 | Robbins et al. | |
| 4,245,149 A | 1/1981 | Fairlie | |
| 4,259,896 A | 4/1981 | Hayashi et al. | |
| 4,268,272 A | 5/1981 | Taura | |
| 4,335,725 A | 6/1982 | Geldmacher | |
| 4,379,352 A | 4/1983 | Hauslein et al. | |
| 4,391,009 A | 7/1983 | Schild et al. | |
| 4,413,857 A | 11/1983 | Hayashi | |
| 4,509,792 A | 4/1985 | Wang | |
| 4,563,387 A | 1/1986 | Takagi et al. | |
| 4,572,430 A | 2/1986 | Takagi et al. | |
| 4,589,656 A | 5/1986 | Baldwin | |
| 4,665,707 A | 5/1987 | Hamilton | |
| 4,671,567 A | 6/1987 | Frobose | |
| 4,685,727 A | 8/1987 | Cremer et al. | |
| 4,712,832 A | 12/1987 | Antolini et al. | |
| 4,729,598 A | 3/1988 | Hess | |
| 4,777,802 A | 10/1988 | Feher | |
| 4,847,933 A | 7/1989 | Bedford | |
| 4,853,992 A | 8/1989 | Yu | |
| 4,866,800 A * | 9/1989 | Bedford | A61G 7/05715 5/652.1 |
| 4,905,475 A | 3/1990 | Tuomi | |
| 4,923,248 A | 5/1990 | Feher | |
| 4,946,220 A | 8/1990 | Wyon et al. | |
| 4,964,674 A | 10/1990 | Altmann et al. | |
| 4,981,324 A * | 1/1991 | Law | A47C 7/74 297/180.11 |
| 4,997,230 A | 3/1991 | Spitalnick | |
| 5,002,336 A | 3/1991 | Feher | |
| 5,004,294 A | 4/1991 | Lin | |
| 5,016,302 A | 5/1991 | Yu | |
| 5,076,643 A | 12/1991 | Colasanti et al. | |
| 5,082,326 A | 1/1992 | Sekido et al. | |
| 5,102,189 A | 4/1992 | Saito et al. | |
| 5,106,161 A | 4/1992 | Meiller | |
| 5,117,638 A | 6/1992 | Feher | |
| 5,138,851 A | 8/1992 | Mardikian | |
| 5,160,517 A | 11/1992 | Hicks et al. | |
| 5,211,697 A | 5/1993 | Kienlein et al. | |
| 5,226,188 A | 7/1993 | Liou | |
| 5,292,577 A | 3/1994 | Van Kerrebrouck et al. | |
| 5,335,381 A | 8/1994 | Chang | |
| 5,354,117 A | 10/1994 | Danielson et al. | |
| 5,356,205 A | 10/1994 | Calvert et al. | |
| 5,370,439 A | 12/1994 | Lowe et al. | |
| 5,372,402 A | 12/1994 | Kuo | |
| 5,382,075 A | 1/1995 | Shih | |
| 5,385,382 A | 1/1995 | Single, II et al. | |
| 5,403,065 A | 4/1995 | Callerio | |
| 5,408,711 A | 4/1995 | McClelland | |
| 5,411,318 A | 5/1995 | Law | |
| 5,416,935 A | 5/1995 | Nieh | |
| 5,450,894 A * | 9/1995 | Inoue et al. | 165/43 |
| 5,516,189 A | 5/1996 | Ligeras | |
| 5,524,439 A | 6/1996 | Gallup et al. | |
| 5,561,875 A | 10/1996 | Graebe | |
| 5,590,428 A | 1/1997 | Roter | |
| 5,597,200 A | 1/1997 | Gregory et al. | |
| 5,613,729 A | 3/1997 | Summer, Jr. | |
| 5,613,730 A | 3/1997 | Buie et al. | |
| 5,620,366 A | 4/1997 | Munzel et al. | |
| 5,626,021 A | 5/1997 | Karunasiri et al. | |
| 5,626,386 A | 5/1997 | Lush | |
| 5,626,387 A * | 5/1997 | Yeh | 297/180.14 |
| 5,639,145 A | 6/1997 | Alderman | |
| 5,645,314 A | 7/1997 | Liou | |
| 5,692,952 A * | 12/1997 | Chih-Hung | B60H 1/00285 297/180.11 |
| 5,701,621 A | 12/1997 | Landi et al. | |
| 5,715,695 A | 2/1998 | Lord | |
| 5,787,534 A | 8/1998 | Hargest et al. | |
| 5,833,309 A | 11/1998 | Schmitz | |
| 5,833,321 A | 11/1998 | Kim et al. | |
| 5,887,304 A | 3/1999 | Von der Heyde | |
| 5,897,162 A | 4/1999 | Humes et al. | |
| 5,902,014 A | 5/1999 | Dinkel et al. | |
| 5,918,930 A | 7/1999 | Kawai et al. | |
| 5,921,100 A | 7/1999 | Yoshinori et al. | |
| 5,921,314 A | 7/1999 | Schuller et al. | |
| 5,921,858 A * | 7/1999 | Kawai | B60N 2/5628 297/180.11 |
| 5,924,766 A * | 7/1999 | Esaki et al. | 297/180.13 |

(56) References Cited

U.S. PATENT DOCUMENTS

| | | | |
|---|---|---|---|
| 5,924,767 A * | 7/1999 | Pietryga | 297/180.13 |
| 5,927,817 A | 7/1999 | Ekman et al. | |
| 5,934,748 A | 8/1999 | Faust et al. | |
| 6,003,950 A * | 12/1999 | Larsson | 297/452.42 |
| 6,019,420 A | 2/2000 | Faust et al. | |
| 6,048,024 A | 4/2000 | Wallman | |
| 6,049,927 A | 4/2000 | Thomas et al. | |
| 6,059,018 A * | 5/2000 | Yoshinori et al. | 165/42 |
| 6,059,362 A | 5/2000 | Lin | |
| 6,062,641 A | 5/2000 | Suzuki et al. | |
| 6,064,037 A | 5/2000 | Weiss et al. | |
| 6,068,332 A | 5/2000 | Faust et al. | |
| 6,079,485 A | 6/2000 | Esaki et al. | |
| 6,085,369 A | 7/2000 | Feher | |
| 6,105,667 A | 8/2000 | Yoshinori et al. | |
| 6,109,688 A | 8/2000 | Wurz et al. | |
| 6,119,463 A | 9/2000 | Bell | |
| 6,124,577 A | 9/2000 | Fristedt | |
| 6,145,925 A | 11/2000 | Eksin et al. | |
| 6,147,332 A | 11/2000 | Holmberg et al. | |
| 6,164,719 A | 12/2000 | Rauh | |
| 6,179,706 B1 * | 1/2001 | Yoshinori et al. | 454/120 |
| 6,186,592 B1 | 2/2001 | Orizaris et al. | |
| 6,189,966 B1 | 2/2001 | Faust et al. | |
| 6,196,627 B1 | 3/2001 | Faust et al. | |
| 6,206,465 B1 | 3/2001 | Faust et al. | |
| 6,223,539 B1 | 5/2001 | Bell | |
| 6,224,150 B1 | 5/2001 | Eksin et al. | |
| 6,237,675 B1 | 5/2001 | Oehring et al. | |
| 6,254,179 B1 | 7/2001 | Kortume et al. | |
| 6,263,530 B1 | 7/2001 | Feher | |
| 6,273,810 B1 | 8/2001 | Rhodes et al. | |
| 6,277,023 B1 * | 8/2001 | Schwarz | 454/120 |
| 6,278,090 B1 | 8/2001 | Fristedt et al. | |
| 6,291,803 B1 | 9/2001 | Fourrey | |
| 6,300,150 B1 | 10/2001 | Venkatasubramanian | |
| 6,321,996 B1 | 11/2001 | Odebrecht et al. | |
| 6,415,501 B1 | 7/2002 | Schlesselman | |
| 6,425,216 B1 | 7/2002 | Gardner et al. | |
| 6,434,328 B2 | 8/2002 | Rutherford | |
| 6,478,369 B1 | 11/2002 | Aoki et al. | |
| 6,481,801 B1 | 11/2002 | Schmale | |
| 6,483,087 B2 | 11/2002 | Gardner et al. | |
| 6,491,578 B2 | 12/2002 | Yoshinori et al. | |
| 6,497,275 B1 | 12/2002 | Elliot | |
| 6,501,055 B2 | 12/2002 | Rock et al. | |
| 6,505,886 B2 | 1/2003 | Gielda et al. | |
| 6,511,125 B1 | 1/2003 | Gendron | |
| 6,539,725 B2 | 4/2003 | Bell | |
| 6,541,737 B1 | 4/2003 | Eksin et al. | |
| RE38,128 E | 6/2003 | Gallup et al. | |
| 6,578,910 B2 | 6/2003 | Andersson et al. | |
| 6,592,181 B2 | 7/2003 | Stiller et al. | |
| 6,598,251 B2 | 7/2003 | Habboub et al. | |
| 6,598,405 B2 | 7/2003 | Bell | |
| 6,604,785 B2 | 8/2003 | Bargheer et al. | |
| 6,606,866 B2 | 8/2003 | Bell | |
| 6,619,382 B1 * | 9/2003 | Ichigaya | A41D 27/28 165/185 |
| 6,619,736 B2 | 9/2003 | Stowe et al. | |
| 6,625,990 B2 | 9/2003 | Bell | |
| 6,626,386 B1 | 9/2003 | Stiner et al. | |
| 6,626,455 B2 | 9/2003 | Webber et al. | |
| 6,626,488 B2 | 9/2003 | Pfahler | |
| 6,629,724 B2 | 10/2003 | Ekern et al. | |
| 6,629,725 B1 | 10/2003 | Kunkel et al. | |
| 6,682,140 B2 | 1/2004 | Minuth et al. | |
| 6,685,553 B2 | 2/2004 | Aoki | |
| 6,687,933 B2 | 2/2004 | Habboub et al. | |
| 6,719,624 B2 | 4/2004 | Hayashi et al. | |
| 6,722,148 B2 | 4/2004 | Aoki et al. | |
| 6,761,399 B2 | 7/2004 | Bargheer et al. | |
| 6,767,621 B2 | 7/2004 | Flick et al. | |
| 6,786,541 B2 | 9/2004 | Haupt et al. | |
| 6,786,545 B2 | 9/2004 | Bargheer et al. | |
| 6,793,016 B2 | 9/2004 | Aoki et al. | |
| 6,808,230 B2 | 10/2004 | Buss et al. | |
| 6,817,675 B2 | 11/2004 | Buss et al. | |
| 6,828,528 B2 | 12/2004 | Stöwe et al. | |
| 6,848,742 B1 | 2/2005 | Aoki et al. | |
| 6,857,697 B2 | 2/2005 | Brennan et al. | |
| 6,869,139 B2 | 3/2005 | Brennan et al. | |
| 6,869,140 B2 | 3/2005 | White et al. | |
| 6,871,696 B2 | 3/2005 | Aoki et al. | |
| 6,886,352 B2 | 5/2005 | Yoshinori et al. | |
| 6,892,807 B2 | 5/2005 | Fristedt et al. | |
| 6,893,086 B2 | 5/2005 | Bajic et al. | |
| 6,928,829 B2 | 8/2005 | Kamiya et al. | |
| 6,929,322 B2 | 8/2005 | Aoki et al. | |
| 6,957,545 B2 | 10/2005 | Aoki | |
| 6,976,734 B2 | 12/2005 | Stoewe | |
| 7,052,091 B2 | 5/2006 | Bajic et al. | |
| 7,083,227 B2 | 8/2006 | Brennan et al. | |
| 7,131,689 B2 | 11/2006 | Brennan et al. | |
| 7,322,643 B2 | 1/2008 | Ishima et al. | |
| 7,364,229 B2 | 4/2008 | Lee | |
| 7,802,843 B2 | 9/2010 | Andersson et al. | |
| 7,828,050 B2 | 11/2010 | Esaki | |
| 8,222,511 B2 * | 7/2012 | Lofy | 136/203 |
| 8,256,236 B2 * | 9/2012 | Lofy | 62/150 |
| 8,360,517 B2 * | 1/2013 | Lazanja | B60N 2/5635 297/180.12 |
| 8,418,286 B2 * | 4/2013 | Brykalski et al. | 5/423 |
| 8,516,842 B2 * | 8/2013 | Petrovski | 62/244 |
| 8,539,624 B2 * | 9/2013 | Terech et al. | 5/652.1 |
| 8,732,874 B2 * | 5/2014 | Brykalski et al. | 5/423 |
| 2001/0035669 A1 | 11/2001 | Andersson et al. | |
| 2002/0003363 A1 | 1/2002 | Buss et al. | |
| 2002/0017102 A1 | 2/2002 | Bell | |
| 2002/0019212 A1 | 2/2002 | Ozeki | |
| 2002/0032923 A1 | 3/2002 | Prisco | |
| 2002/0057006 A1 * | 5/2002 | Bargheer | B60H 1/00285 297/180.14 |
| 2002/0063451 A1 * | 5/2002 | Bargheer | B60H 1/00285 297/180.12 |
| 2002/0067058 A1 | 6/2002 | Pfahler | |
| 2002/0092308 A1 | 7/2002 | Bell | |
| 2002/0096915 A1 * | 7/2002 | Haupt et al. | 297/180.13 |
| 2002/0096931 A1 | 7/2002 | White et al. | |
| 2002/0105213 A1 | 8/2002 | Rauh et al. | |
| 2002/0108381 A1 | 8/2002 | Bell | |
| 2002/0139123 A1 | 10/2002 | Bell | |
| 2002/0140258 A1 | 10/2002 | Ekern et al. | |
| 2002/0148234 A1 | 10/2002 | Bell | |
| 2002/0148235 A1 | 10/2002 | Bell | |
| 2002/0148236 A1 | 10/2002 | Bell | |
| 2002/0148345 A1 | 10/2002 | Hagiwara | |
| 2002/0150478 A1 * | 10/2002 | Aoki | B60H 1/00457 417/44.1 |
| 2003/0005706 A1 | 1/2003 | Bell | |
| 2003/0024924 A1 | 2/2003 | Fristedt | |
| 2003/0029173 A1 | 2/2003 | Bell et al. | |
| 2003/0079770 A1 | 5/2003 | Bell | |
| 2003/0084935 A1 | 5/2003 | Bell | |
| 2003/0102699 A1 | 6/2003 | Aoki et al. | |
| 2003/0150229 A1 | 8/2003 | Aoki et al. | |
| 2003/0186642 A1 | 10/2003 | Aoki | |
| 2003/0214160 A1 | 11/2003 | Brennan et al. | |
| 2004/0036326 A1 | 2/2004 | Bajic | |
| 2004/0090093 A1 * | 5/2004 | Kamiya | B60N 2/5657 297/180.14 |
| 2004/0100131 A1 | 5/2004 | Howick et al. | |
| 2004/0104607 A1 | 6/2004 | Minegishi et al. | |
| 2004/0118555 A1 | 6/2004 | Fristedt | |
| 2004/0139758 A1 | 7/2004 | Kamiya et al. | |
| 2004/0160093 A1 | 8/2004 | Stoewe | |
| 2004/0164594 A1 * | 8/2004 | Stoewe | B60N 2/5657 297/180.14 |
| 2004/0189061 A1 | 9/2004 | Hartwick et al. | |
| 2004/0195870 A1 | 10/2004 | Bohlender et al. | |
| 2004/0198212 A1 * | 10/2004 | Aoki | B60H 1/00285 454/120 |
| 2004/0245811 A1 | 12/2004 | Bevan et al. | |
| 2005/0066505 A1 | 3/2005 | Iqbal et al. | |

(56) References Cited

U.S. PATENT DOCUMENTS

| | | | |
|---|---|---|---|
| 2005/0067862 A1 | 3/2005 | Iqbal et al. | |
| 2005/0086739 A1* | 4/2005 | Wu | 5/423 |
| 2005/0093347 A1 | 5/2005 | Bajic et al. | |
| 2005/0111167 A1* | 5/2005 | Yamaguchi | B60L 15/007 361/676 |
| 2005/0140189 A1 | 6/2005 | Bajic et al. | |
| 2005/0173950 A1 | 8/2005 | Bajic et al. | |
| 2005/0200179 A1 | 9/2005 | Bevan et al. | |
| 2005/0243331 A1* | 11/2005 | Ishima | B60N 2/5635 356/614 |
| 2005/0257541 A1 | 11/2005 | Kadle et al. | |
| 2005/0264086 A1 | 12/2005 | Lofy et al. | |
| 2006/0038432 A1 | 2/2006 | Koehler | |
| 2006/0042788 A1* | 3/2006 | Naruse | B60H 1/00028 165/202 |
| 2006/0112826 A1 | 6/2006 | Ichigaya | A47G 9/1036 96/4 |
| 2006/0138812 A1* | 6/2006 | Aoki | B60N 2/5635 297/180.14 |
| 2006/0151455 A1* | 7/2006 | Stowe | B60N 2/5635 219/202 |
| 2006/0152044 A1 | 7/2006 | Bajic et al. | |
| 2006/0158011 A1 | 7/2006 | Marlovits et al. | |
| 2006/0175877 A1* | 8/2006 | Alionte et al. | 297/180.14 |
| 2006/0199492 A1 | 9/2006 | Ozeki | |
| 2006/0267260 A1* | 11/2006 | Stowe | B60N 2/5621 267/143 |
| 2006/0290175 A1 | 12/2006 | Hartwich | |
| 2007/0001490 A1 | 1/2007 | Lee | |
| 2007/0001507 A1 | 1/2007 | Brennan et al. | |
| 2007/0063552 A1* | 3/2007 | Wang et al. | 297/180.11 |
| 2007/0107440 A1* | 5/2007 | Ito | B60N 2/5635 62/3.2 |
| 2007/0120399 A1 | 5/2007 | Bajic | |
| 2007/0176470 A1 | 8/2007 | Stoewe et al. | |
| 2007/0188007 A1 | 8/2007 | Lazanja et al. | |
| 2007/0251016 A1* | 11/2007 | Feher | A47C 7/74 5/713 |
| 2007/0289789 A1* | 12/2007 | Tsuchiya | B60K 1/04 180/68.2 |
| 2007/0292752 A1* | 12/2007 | Tsuchiya | B60L 11/1874 429/120 |
| 2008/0047767 A1* | 2/2008 | Tsuchiya | H01M 2/1072 180/68.5 |
| 2008/0290702 A1* | 11/2008 | Shin | B60N 2/5628 297/180.13 |
| 2009/0000031 A1* | 1/2009 | Feher | A47C 7/74 5/423 |
| 2009/0096256 A1* | 4/2009 | Kikuchi | B60R 11/0264 297/180.1 |
| 2010/0038937 A1 | 2/2010 | Andersson et al. | |
| 2010/0071130 A1* | 3/2010 | Frias | A47C 21/044 5/421 |
| 2010/0071980 A1* | 3/2010 | Kokaji | B60H 1/00278 180/68.5 |
| 2010/0231035 A1* | 9/2010 | Tsuchiya | B60H 1/00278 307/9.1 |
| 2010/0287701 A1* | 11/2010 | Frias | A47C 21/044 5/423 |
| 2010/0289302 A1* | 11/2010 | Cheng | 297/180.12 |
| 2010/0300644 A1* | 12/2010 | Chung | B60N 2/5635 165/41 |
| 2010/0301643 A1* | 12/2010 | Lazanja | B60N 2/5635 297/180.12 |
| 2010/0314071 A1* | 12/2010 | Lee | B60H 1/00285 165/59 |
| 2011/0109128 A1 | 5/2011 | Axakov et al. | |
| 2011/0186560 A1 | 8/2011 | Kennedy et al. | |
| 2011/0226461 A1* | 9/2011 | Fujii | B60H 1/00285 165/200 |
| 2012/0006424 A1* | 1/2012 | Yoon | 137/343 |
| 2012/0013153 A1* | 1/2012 | Chang | B60N 2/5635 297/180.1 |
| 2012/0079656 A1* | 4/2012 | Lewis | A61F 7/00 5/81.1 R |
| 2012/0129439 A1 | 5/2012 | Ota et al. | |
| 2012/0187740 A1* | 7/2012 | Kim | A47C 7/021 297/452.45 |
| 2012/0261974 A1 | 10/2012 | Yoshizawa et al. | |
| 2012/0315132 A1* | 12/2012 | Axakov et al. | 415/182.1 |
| 2013/0082457 A1* | 4/2013 | Hashido | B60R 21/207 280/730.1 |
| 2013/0097777 A1* | 4/2013 | Marquette et al. | 5/423 |
| 2013/0300159 A1 | 11/2013 | Berroth | |
| 2014/0110978 A1* | 4/2014 | Schneider | A61G 5/10 297/180.1 |
| 2014/0124989 A1* | 5/2014 | Tani | B29C 49/04 264/540 |
| 2014/0256244 A1* | 9/2014 | Sakurai | B60H 1/247 454/140 |
| 2015/0008716 A1* | 1/2015 | Dry | B60N 2/44 297/452.18 |
| 2015/0069811 A1* | 3/2015 | Sachs | B60N 2/4495 297/423.1 |
| 2015/0079892 A1* | 3/2015 | Bauer | B60N 2/5642 454/120 |
| 2015/0224006 A1* | 8/2015 | Primo | A47C 7/744 297/180.14 |
| 2016/0023580 A1* | 1/2016 | Bauer | B60N 2/5628 454/120 |

FOREIGN PATENT DOCUMENTS

| | | |
|---|---|---|
| DE | 3513909 A1 | 10/1986 |
| DE | 3705756 A1 | 10/1988 |
| DE | 4112631 C1 | 4/1992 |
| DE | 19503291 A1 | 8/1996 |
| DE | 19528352 C2 | 1/1997 |
| DE | 19654370 C1 | 3/1998 |
| DE | 19736951 A1 | 3/1999 |
| DE | 19737636 A1 | 3/1999 |
| DE | 19805174 C1 | 6/1999 |
| DE | 19804284 A1 | 8/1999 |
| DE | 19810936 A1 | 9/1999 |
| DE | 19920451 A1 | 12/1999 |
| DE | 1995497 C1 | 1/2001 |
| DE | 10001314 A1 | 7/2001 |
| DE | 10013492 A1 | 9/2001 |
| DE | 10024880 C1 | 9/2001 |
| DE | 10030708 A1 | 1/2002 |
| DE | 10116345 A1 | 6/2002 |
| DE | 10144839 A1 | 3/2003 |
| DE | 10241571 A1 | 3/2004 |
| DE | 10261902 A1 | 8/2004 |
| DE | 10316732 A1 | 10/2004 |
| DE | 10338525 A1 | 3/2005 |
| DE | 10346064 A1 | 4/2005 |
| EP | 0128534 A2 | 12/1984 |
| EP | 0280213 A1 | 8/1988 |
| EP | 0517615 A1 | 12/1992 |
| EP | 0411375 B1 | 5/1994 |
| EP | 0809576 B1 | 5/1999 |
| EP | 0936105 A1 | 8/1999 |
| EP | 0730720 B1 | 7/2000 |
| EP | 1088696 A3 | 9/2000 |
| EP | 1050429 A2 | 11/2000 |
| EP | 1123834 A1 | 2/2001 |
| EP | 1266794 A2 | 12/2002 |
| EP | 1075984 B1 | 5/2003 |
| EP | 1323573 A2 | 7/2003 |
| EP | 1349746 B1 | 8/2005 |
| FR | 1266925 A | 7/1961 |
| FR | 2599683 A1 | 6/1986 |
| FR | 2630056 A1 | 10/1989 |
| FR | 2694527 A1 | 2/1994 |
| FR | 2845318 A1 | 4/2004 |
| JP | 1171509 A | 7/1989 |
| JP | 5277020 A | 10/1993 |
| JP | 07290466 A | 11/1995 |
| JP | 8285423 A | 11/1996 |
| JP | 10044756 A | 2/1998 |
| JP | 2000125990 A | 2/2000 |
| JP | 2001071800 A | 3/2001 |
| JP | 2002125801 A | 5/2002 |

(56) References Cited

FOREIGN PATENT DOCUMENTS

| | | | |
|---|---|---|---|
| JP | 2002225539 A | 8/2002 | |
| JP | 2002234332 A | 8/2002 | |
| JP | 2003042594 A | 2/2003 | |
| JP | 2004224108 A | 8/2004 | |
| JP | 2004283403 A | 10/2004 | |
| SE | 202556 C | 3/1966 | |
| SE | 0102983 | 3/2003 | |
| SE | 523659 C2 | 5/2004 | |
| WO | 91/12150 A1 | 8/1991 | |
| WO | 94/09684 A1 | 5/1994 | |
| WO | 96/05475 A1 | 2/1996 | |
| WO | 97/09908 A1 | 3/1997 | |
| WO | 99/00268 A1 | 1/1999 | |
| WO | 02/06914 A1 | 1/2002 | |
| WO | 02/005341 A2 | 7/2002 | |
| WO | 03/015583 A2 | 2/2003 | |
| WO | 03/051666 A1 | 6/2003 | |
| WO | 03/077710 A1 | 9/2003 | |
| WO | 03/101777 A1 | 12/2003 | |
| WO | 03/106215 A1 | 12/2003 | |
| WO | 2004/005068 A1 | 1/2004 | |
| WO | 2004/082989 A2 | 3/2004 | |
| WO | 2004/028857 A1 | 4/2004 | |
| WO | 2004/078517 A2 | 9/2004 | |
| WO | 2004/091966 A1 | 10/2004 | |
| WO | 2004/091967 A2 | 10/2004 | |
| WO | 2004/096601 A1 | 11/2004 | |
| WO | 2004/096602 A1 | 11/2004 | |
| WO | 2005/021320 A1 | 3/2005 | |
| WO | 2005/035305 A1 | 4/2005 | |
| WO | 2005/042299 A1 | 5/2005 | |
| WO | 2005/042301 A1 | 5/2005 | |
| WO | 2005/047056 A1 | 5/2005 | |
| WO | 2005/068253 A1 | 7/2005 | |
| WO | 2005/110806 A1 | 11/2005 | |

OTHER PUBLICATIONS

Automotive Seat Heating Systems, Bauerhin International, received by Assignee W.E.T. Automotive Systems; dated May 2002.
Excerpt from website http://www.icar.com/html_pages/about_icar/current_events_news/advantage/advantageI-Car Advantage Online; dated Aug. 27, 2001.
Excerpt from website http://www.seatcomfort.com/semashow1.htm, Specializing in Seat Ventilation and Heating Systems, Seat Comfort Systems Unveils 3 New Seat Heater Products; dated Oct. 29, 2001.
Excerpt from website http://www.seatcomfort.com/ventilation.htm, Specializing in Seat Ventilation and Heating Systems, Ventilation; dated Jun. 10, 2003.
GMT 830 Heating & Ventilation System, IGB Automotive Ltd., received by Assignee W.E.T. Automotive Systems; dated Jun. 2003.
International Search Report for Application Serial No. PCT/US03/19929; dated Oct. 10, 2003.
Komfortabel bei jeder Temperatur; earliest date known available 2010.
Seat Heating Systems, Kongsberg Automotive, believed to be from website http://www.kongsberg-automotive.no/; earliest known date available 2000.
Copending U.S. Appl. No. 60/505,806, filed Sep. 25, 2003.

* cited by examiner

VENTILATION SYSTEM

FIELD OF THE INVENTION

One subject in accordance with the invention at hand is a ventilation system in accordance with the generic term of Claim 1. The system may be used, for example, for the ventilation of seat surfaces or for the heating of armrests, particularly in vehicles.

BACKGROUND OF THE INVENTION a. State of the Art

For the ventilation of seat surfaces, it has been known, for example from DE 197 36 951, to arrange a space fabric on the surface of the seat and to guide a flow of air through it. However, the special fabrics are expensive.

From DE 195 27 352 C2 it has been known to design the foam padding of a seat in the shape of nubs. However, this may make the manufacture of the padding considerably more expensive. Also, such nubs are easily compressible, making a blockage of the air circulation possible.

Some applications require alternative or improved options that are advantageous with regard to their manufacturing costs, to their ability to create a pleasant climate, to an efficient distribution of larger volumes of air, to their compression stability, to their softness and/or to their energy consumption.

SUMMARY OF THE INVENTION

Against this backdrop, a technical concept with the characteristics of Claim 1 is being proposed. Additional advantageous embodiments can be gleaned from the additional claims and the subsequent description.

BRIEF DESCRIPTION OF THE DRAWINGS

In the following, details of the invention will be explained. These statements should make the invention comprehensible. However, they have only exemplary character. Of course, individual or several characteristics as described may be omitted, modified or supplemented within the framework of the invention defined by independent claims. Also, the characteristics of various embodiments may be combined with each other. The decisive factor is that the concept of the invention be essentially implemented. If one characteristic can be partially fulfilled, this will include that this characteristic is fulfilled completely as well, or is essentially completely fulfilled. "Essentially" shall denote in this context in particular that the implementation permits obtaining the desired benefit to a recognizable extent. This may mean in particular that a corresponding characteristic is met at least at 50%, 90%, 95% or 99%. If a minimum amount is indicated, it will of course be possible to use more than such a minimum amount. If the number of a component is indicated with at least one, this shall also include embodiments with two, three or any other multitude of components. What is described for one object may also be applied to the overwhelming part or totality of all other objects of the same type. Unless stated to the contrary, intervals shall include their boundary points.

In the following, reference will be made to.

DETAILED DESCRIPTION

Figure 1:
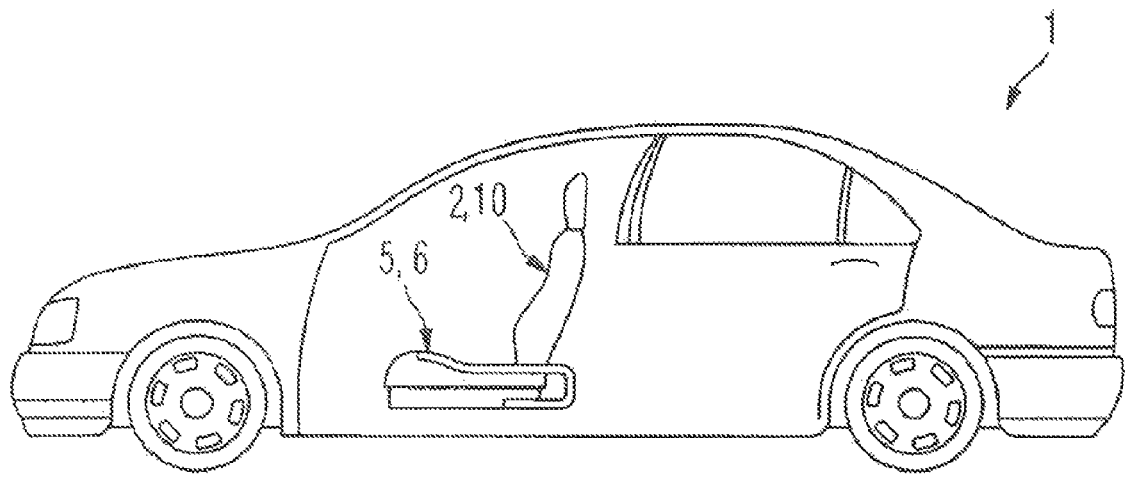
FIG. 1 Vehicle 1 with a seat as climatized Object 2 in a partial longitudinal cut FIG. 2 Top view of a ventilation device 20 designed as an insertable module in a partial upright projection with a flat air flow device 22 formed by an encasing device 224 and spacers 2252 made of foam rubber glued onto it FIG. 3 Top view of a second embodiment of a ventilation device 20 with an encasing device 224 and a multitude of deep-drawn nub-like spacers 2252, opened and in a top view FIG. 4 Ventilation device 20 of FIG. 3 in a longitudinal cut FIG. 5 Spacing mechanism 225 with cube-shaped, circular-shaped, drop-shaped, nub-shaped and elongated spacers 2252 on a spacer carrier 2253 in a perspective view FIG. 6 Enlarged view of a cone-shaped spacer 2252 made of foil, with a flattened top 22521
Figure 2:
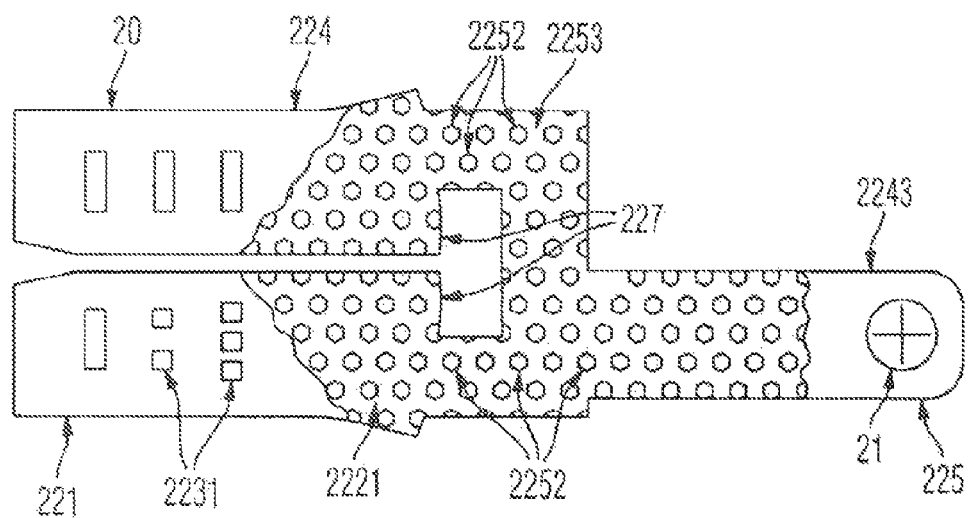
Figure 3:
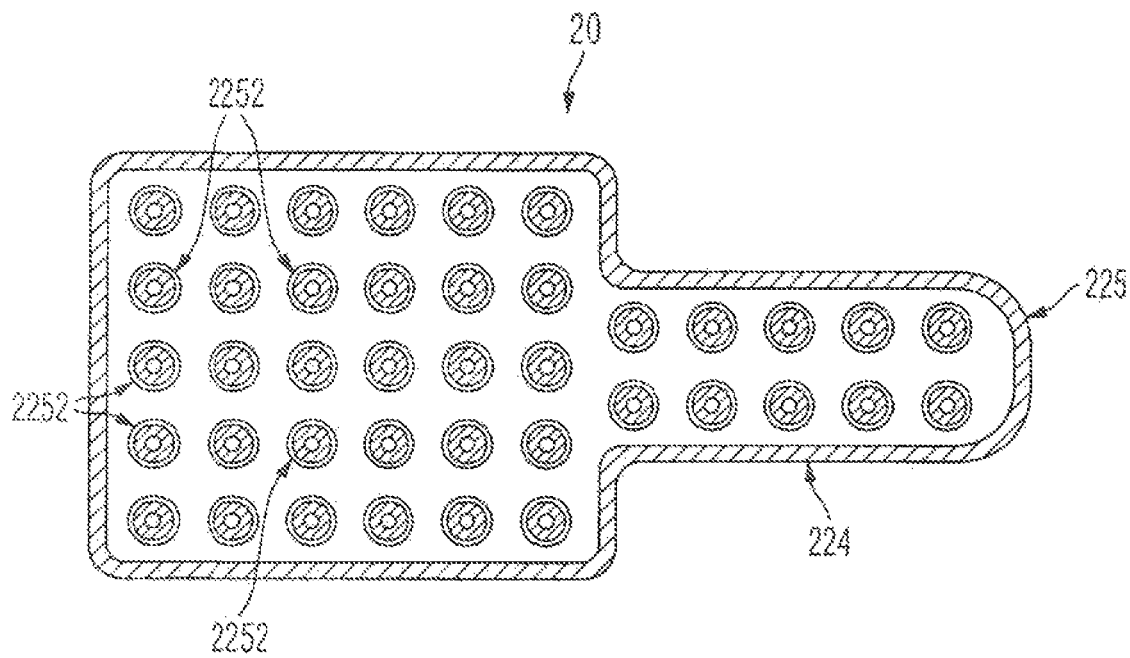

The invention is particularly well suited for use in vehicles. This denotes in particular all land, water or aircraft such as, for example, an airplane, a rail vehicle, a ship or a motor vehicle.

The invention is moreover suited for use in all objects whose surface is to be conditioned at least partially in such a way that at least certain climatic parameters, for example temperature or humidity, are kept at a desired interval or at a certain value at least close to the surface. Therefore, "climate object" denotes in particular all components with which the user of a vehicle 1 may come in contact in a passenger compartment such as, for example, a steering mechanism for a vehicle, a dashboard, an armrest, a door paneling, a seat cover, a heating blanket, a padding 5, a cover 6 or a seat.

It may be useful for at least one vehicle to have at least one climate object 2, such as, for example, a seat. This permits the air-conditioning and climatization of a passenger even during long trips.

It may be useful for at least one climate object 2 to have at least one padding 5, such as, for example, a block of foam polyurethane.

It may be useful for at least one padding 5 to have at least one ventilation opening 51 such as, for example, an elongated, tube-shaped opening in a foam padding.

It may be useful for at least one climate object 2 to have at least one cover 6. This denotes any kind of surface covering the padding, such as, for example, a leather or textile cover or an external skin of a padding foam.

It may be useful for at least one climate object 2 to have at least one climate device 10. This denotes all devices that serve to regulate the temperature, humidity and/or air movement in an area to be climatized such as, for example, the air conditioning/climatization of surfaces touched by the user(s) in the passenger compartment of a vehicle 1.

If at least one climatization device 10 is arranged at least partially inside of a climate object 2, this will assure a reliable air flow in the climate object 2. If at least one climatization device 10 is arranged at least partially outside of a climate object 2, this will facilitate an optimal exchange with the surroundings of the climate object 2.

It may be useful for at least one climate object 2 to have at least one ventilation device 20. This denotes any device that can be used for a specific change of the air composition or of the air flow in a certain surface or spatial area for an exchange of air, such as, for example, an on-board air conditioner, spacing media that are at least partially permeable to air, spacing knitted fabrics and/or climatization insertions. Their number may be selected in such a way that, for example, one ventilation device 20 will be provided for each climate object 2 or for each surface to be climatized.

Preferably, at least one ventilation device 20 is at least partially made of a textile material. This means all materials in which a multitude of elongated, essentially linear structures such as threads, fibers, filaments are integrated into an essentially plane structure or are combined into one using a textile-producing or textile-processing method. In this context, weaving, knitting or knotting are the prime candidates to be used as methods. This permits light-weight, air permeable and pressure and tensile-resistant designs.

It may be useful for at least one ventilation device 20 to have at least one air movement mechanism 21. This denotes any device that is suitable to move air out of the climatized object 2 and/or into it, in particular air flow machines such as, for example, axial or radial ventilators. Their number may be selected in such a way that, for example, one air movement mechanism 21 is provided for each climate object 2 or each surface to be climatized.

If at least one air movement mechanism 21 is arranged at least partially inside of a climate object 2, it will permit the creation of a decentralized, structural unit. At least one air movement mechanism 21 is favorably arranged in an opening of the climate object 2.

If at least one air movement mechanism 21 is at least partially arranged outside of a climate object 2, it will facilitate the use of an already existing vehicle air conditioner or the retrieval of air from cooler sections of a vehicle 1 such as, for example, from the trunk or from the foot space. If at least one air movement mechanism 21 is arranged at least partially inside of an air flow device 22 or, respectively, an air exchange device 221, it will facilitate the realization of a compact module with high pressure output, for example by means of a radial ventilator.

At least one air movement mechanism 21 and/or at least one air exchange device 221 is suitably arranged at a distance from a surface to be climatized, for example on a side of a vehicle seat B-side turned away from the user and connected to the side of a vehicle seat turned to the user on the A-side via at least one air passage channel 2222.

It may be advantageous if at least one air movement mechanism 21 is detachably connected with at least one air flow device 22 and/or at least one air exchange device 221 via an adapter.

It may be advantageous if at least one air movement mechanism 21 is directly or indirectly attached to at least one air flow device 22 and/or at least one air exchange device 221 in material-fitting form, for example by means of gluing, welding, ultrasound welding or vulcanization. The housing of the air movement mechanism 21 is preferably glued, welded, screwed or riveted to the spacing device. Preferably, the air movement mechanism 21 will blow air into the object 2 to be climatized. However, it may also suction air from it during suction operation. In the event of a suction operation, the air movement mechanism is preferably arranged on the side of the spacing device or, respectively, of the air flow device 22 turned away from the padding 5 and the projections of respectively, from spacers 2252.

Any systems intended for air injection operation have their air movement mechanism 21 preferably on the same side of the spacing device 225 or, respectively, of the air flow device 22 as the projections or, respectively, the spacers 2252 and the padding 5. Preferably, an area is provided therefor in which the spacers and/or the spacing device have been completely or partially removed in order to create space for the ventilator in the opening. In this context, the ventilator preferably involves a radial ventilator whose blow-off direction coincides at least essentially with the direction of the course of the air flow device 22 and whose blow-off openings lie at least partially on the same height level in the seat as the air flow device 22.

The contact surface between the housing of the air movement mechanism 21 and the spacing device is preferably circumferentially closed around the latter at least at the common passage opening and has a breadth of at least the breadth of the spacers 2252 of the spacing device. In this way, a loss of air can be avoided, for example in the case of nubbed plates.

It may be useful for at least one ventilation system 20 to have at least one air flow device 22. This will permit a well-directed transport of air from at least one air movement mechanism 21 to at least one air exchange device 221 or in the opposite direction.

At least one air flow device 22 may be advantageously arranged in at least one recess of a climate object 2 or of a padding 5. Preferably, at least one air flow device 22 is arranged at least partially in such a way that it tunnels tinder an anchoring device for an anchoring trench 54 on the A-side of a padding 5 facing a user, for example in the form of a segmented shaft of synthetic frames and covered towards a cover 6 with a spacing fabric.

It may be useful for at least one ventilation system 20 or at least one air flow device 22 to have at least one air exchange device 221 in order to connect at least one air movement mechanism 21 with the surroundings of the climate object in air-permeable fashion. This will permit an exchange of air between the air flow device 22 or, respectively, the ventilation system 20 and a surface to be climatized of the object to be climatized. It may be useful if the number of an air exchange device 221 [refers to] each surface to be climatized.

Preferably, at least one air exchange device 221 is shaped at least partially in such a way that it forms a flat component preferably of the size of a surface to be climatized. It may be useful if at least one air exchange device 221 has a thickness that amounts to maximally 30% of the padding thickness. It may be useful if the value lies within a range between 5 and 20 mm, preferably between 10 and 15 mm. This will permit an integration into a padding without impairing its padding effect.

Preferably, at least one air exchange device 221 is arranged at least partially close to a surface to be climatized of the object to be climatized, for example between a padding 5 and a surface to be climatized, preferably between a seat foam padding 5 and a seat cover 6, for example under the cover 6 on a side of a seat A-side facing a user.

It may be useful if at least one air exchange device 221 is arranged at least partially in such a way that it will not be noticeable on the surface to be climatized. It may be useful if at least one air exchange device 221 is at least partially at a distance from the surface to be climatized, preferably by arranging the air exchange device 221 on the B-side of a vehicle seat turned away from a user. In this case, the air exchange device 221 is connected with the surface of the A-side to be climatized and facing a user through one or several passage channels 2222 penetrating the foam of a padding 5. This will permit the use of even harder materials for the air exchange device 221.

Preferably, at least one air exchange device 221 will extend essentially parallel to surface to be climatized. At least one air exchange device 221 is advantageously integrated into a ventilation opening 51 of at least one climate object 2 or foamed into the climate object 2.

It may be useful for at least one ventilation system 20 or at least one air flow device 22 or at least one air exchange device 221 to have at least one air distribution layer 2221. This denotes a flat component that is penetrable by air in at least one direction along its plane, preferably in at least two directions. This will permit the appropriate distribution of air fed from an air movement mechanism 21 to an air flow device 22 onto a surface to be climatized or to suction off the air present on this surface to be climatized and to feed it into the air movement mechanism 21 via the air flow device 22.

It may be useful for at least one ventilation system 20 to have at least one air passage channel 2222. This will permit for example the transport of air from the air exchange device 221 to a surface to be climatized or to an air movement mechanism 21 or in the opposite direction. If at least one air passage channel 2222 is at least partially foamed into a padding 5; inserted into a ventilation recess 51 in a padding 5; or formed by such a ventilation recess 51 in the padding 5, it will facilitate an easy installation and a secure attachment. Preferably, at least one air passage channel 2222 is arranged at least partially along a B-side of the padding 5 turned away from a user or along a lateral surface of the padding 5 and/or along an A-side of a padding 5 facing a user, preferably imbedded in a ventilation recess 51 in the padding 5. This will facilitate an easy air transport to the surface to be climatized without impairing the stability or the installation of the padding 5. If at least one air passage channel 2222 is at least partially arranged below an air exchange device 221, for example a spacing fabric, it will facilitate an efficient distribution of air and simultaneously an easy installation.

Preferably, at least one air passage channel 2222 is permeable to air at least partially on its A-side and preferably barely or not at all permeable to air on its B-side. Preferably, a layer of fleece and/or a flat heating device 31, for example a flat textile surface heating element, is arranged on or in the air exchange device 221 above the air passage channel 2222. Preferably, at least one air passage channel 2222 is attached to an air movement mechanism 21 at least at one of its ends. If the air movement mechanism 21 is at a distance from the object to be climatized 2, the air passage channel is preferably impenetrable to air or impenetrably encased at least in certain sections.

Preferably, at least one channel branch 227, at least one air movement mechanism 21 and/or at least one air exchange device 221 will have at least one air passage opening 2231, for example in the form of perforations in a leather cover or pores or loops in a textile surface material. This permits a connection of the interior of the air exchange device 221 with the surroundings of the surface to be climatized in air-permeable fashion. It is useful to select the number and position of the air passage openings 2231 in such a way that a uniform exchange of air across the entire surface to be climatized will occur. It may be useful if the number of air passage openings 2231 lies within a range of 2-40, preferably 3-15 in a row relative to an air flow direction in an air exchange device 221 and/or a channel branch 227. It may he useful if it lies within to range of 2-20, preferably 2-15next to each other relative to an air flow direction in an air exchange device 221 and/or a channel branch 227.

It may be useful for at least one air exchange device 221 to have at least one deflection device 2225. This denotes a preferably flat, air-slowing component such as, for example, a foil. This will permit a deflection of the air flowing through air passage channels 2222, in particular in the ease of air conditioning systems 10 blowing out on the A-side, and a better distribution on the surface. Preferably, their number will be selected in such a way that it corresponds to the number of air passage channels 2222. If a least one deflection device 2225 is at least partially arranged in such a way that it is arranged flush with the flow direction of the air and at a right angle to at least one air passage channel 2222.

It may be useful for at least one air flow device 22 to have at least one connecting device 222 such as hoses or channels in the foam of a padding It may be useful for at least one air flow device 22 to have at least one connection to the surroundings 223 via which the air movement mechanism 21 is provided with an additional connection to the surroundings in addition to the air exchange device 221. At least one connection to the surroundings 223 is preferably arranged in such a way, at least partially, that it will be located on a side of the air movement mechanism 21 other than the air exchange device 221 relative to the flow direction of the air through the air flow device 22.

It may be useful for at least one air flow device 22, one encasing device 224 and/or one air exchange device 221 to have at least one air passage opening 2231 in order to be able to exchange air with the surroundings. Preferably, their number and/or their size will be selected in such a way that it increases with increasing distance from an air movement mechanism 21 in order to achieve a sufficient air exchange even in areas that are more distant from an air movement mechanism 21.

It may be useful for at least one air flow device 22 to have at least one encasing device 224. This denotes any device that blocks air transported in the air flow device 22 from leaving the air flow device at any undesired place such as, for example, foam channels, foils or hoses. Preferably, at least one encasing device 224, at least a first encasing segment 2241 and/or a second encasing segment 2242 is made at least partially of a textile flat material, for example a weave, a foil impermeable to air, for example made of PET, PA, PP or PU, an air-impeding layer of textile material or a hard synthetic such as polyacryl, PA or hard PVC. Preferably, at least one encasing device 224 has a surface that is at least partially turned towards the interior side of the encasing device 224, and smooth. This permits a low-friction transport of air.

It may be useful for at least one encasing device 224 to have at least one first encasing segment 2241 such as, for example, a cover foil or a padding foam.

It may be useful for at least one encasing device 224 to have at least one first encasing segment 2241 such as, for example, an upper cover layer of an air flow layer 2251, a foam padding 5 of a seat or a stiff profile. Preferably, at least one first encasing segment 2241 has at least partially different air impermeability than a second encasing segment 2242. For example, an encasing segment turned towards the cover 6 may permit an escape of air, but the side turned away from the cover 6 prevent any losses of air. Advantageously, at least one first encasing segment 2241 and at least one second encasing segment 2242 are connected with each other in airtight fashion, for example glued and/or welded. This creates at least locally an essentially complete encasing along a cross-sectional circumference of an air flow that flows through the air flow device 22 in a main flow direction.

It may be useful for at least one encasing device 224 to have at least one sealing device 2243, for example a welding seam or a gap ring, for example between a sealing lip and an elongated projection. This will permit to seal at least two encasing segments against each other in order to block any undesired lateral escape of air from the air flow device 22.

It may be useful for at least one sealing device 2243 to have a height that is the same or higher than the spacing mechanism 225 and/or their spacer(s) 2252. During the assembly, this will cause a minimal contact pressure to press the sealing device 2243 against the spacing mechanism 225, thereby sealing it against the exterior.

Preferably, at least one sealing device 2243 is arranged at least partially on a padding 5, preferably connected with it in material-fitting fashion. At least one part of a sealing device 2243 may be advantageously formed as one piece out of the padding 5 and may be an integral part of the latter, for example by means of simultaneous manufacture during foaming or through subsequent stamping or milling.

It may be useful for at least one sealing device 2243 to have at least one sealing lip 22432. The latter may be preferably formed, at least partially, by an elongated projection and arranged, at least in segments, on at least a marginal area of an air flow device 22 or, respectively, a ventilation recess 51.

Preferably, at least one additional sealing recess 22431 is provided between the sealing lip 22432 and a residual area of the padding 5 in order to accommodate one or several spacers 2252 of a spacing device 225.

Preferably, at least one sealing lip 22432 and/or at least one sealing recess 22431 is arranged at least partially circumferentially around the air flow device 22 or, respectively, the ventilation recess 51. Preferably, the sealing lip 22432 and/or the sealing recess 23431 envelop at least 60% of the edge of a ventilation recess 51 in the padding 5.

If at least one sealing lip 22432 may be arranged at least partially in such a way that it protrudes at least partially into a spacing device 225, preferably into a free space between at least two spacers 2252, it will create a seal that may be easy to install. The spacing device 225 or, respectively, the air flow device 22 is preferably inserted into a ventilation recess 51 in such a way that that the exterior spacers 2252 come to lie in the sealing recess 22431 and are separated from the remaining spacers 2252 of the spacing device and sealed by the sealing lip. It may be useful for at least one sealing lip 22432 to have a breadth that is the same or slightly less than the distances between spacers 2252 in order to achieve a great sealing effect.

It may be useful for at least one ventilation system 20; one air flow device 22; one connecting device 222; or one air exchange device 221 to have at least one spacing device 225, for example a spacing fabric, a multitude of nubs, hoses or chain links. This will make it possible to keep at least one segment of the ventilation system 20 permeable for air even if the ventilation system 20 is compressed under a mechanical load.

Preferably, at least one spacing device 225 is at least partially formed by a cross-linked fiber or extrusion material. Preferably, this spacing device 225 has the form of a nub-like plate. In this case, the nubs are flattened at their tops, and at least in this area, three or more fibers/filaments/strands of the netting material are connected with each other in order to obtain an adequate gluing surface and compressive strength. Preferably, a relative dislocation relative to each other is prevented at least at the connecting sites of the fibers or filaments, in particular by means of fusion, gluing or the like. Preferably, the cross-linked material was arranged during its manufacture on a surface profiled with protections so that the resulting material corresponds to a net-like or perforated surface or plate.

Preferably, at least one spacing device 225 is at least partially made of a flat synthetic material, for example of polyethylene foil. This permits the production of rigid spacing devices on a B-side.

It may be useful for at least one spacing device 225 to be attached at least partially to an encasing device 224. Preferably, the spacing device 225 is at least partially arranged in a ventilation recess 51 of the padding.

Preferably, at least one spacing device 225 is arranged at least partially on a B-side of the padding 5 turned away from a user and/or at a distance of at least 30 mm from the surface of the A-side or, respectively, from the user. Preferably, the spacing device 225 is arranged completely on the B-side of the padding 5 in order to achieve sufficient softness of the padding.

It may be useful for at least one spacing device 225 to be arranged at least partially on an encasing device 224, for example by means of insertion into the encasing device 224 in the case of spacing fabrics or hoses, gluing of the two components in the case of small assembly components or their simultaneous manufacture from a single piece by means of deep drawing of foil or foaming of nubs into a foamed carrier.

Preferably, at least one spacing device 225 is at least partially flexible in order to be able to follow any bends of the ventilation system 20 or, respectively, of the air flow device 22. Preferably, at least one spacing device 225 is at least partially elastic but only marginally compressible so as not to impair the seating comfort. Preferably, at least one spacing device 225 is at least partially reducible in its thickness/height through normal operating loads by maximally 70%, preferably by maximally 50%, preferably by less than 30%.

Preferably, at least one spacing device 225 is at least partially better air conductive in a flow direction of the air flow device 22 than in a transverse direction. To this end, the distance of the spacers 2252 along a main flow direction is preferably smaller than transversally to the main flow direction, at least in one section. The distances between the spacers 2252 along a main flow direction are between 1 and 40 mm, preferably between 5 and 25 mm, preferably between 8 and 15 mm. The distances at a right angle to a main flow direction are between 2 and 40 mm, preferably between 8 and 25 mm, preferably between 10 and 16 mm.

However, the air permeability of the spacing device 225 may also be equally well conductive in two or all directions of the plane of the air flow device 22. Thus, their flow resistance is essentially independent of any direction. For sufficient air permeability, it may be useful if at least 45% air permeable cross sectional surface is available transversally to the flow direction.

It may be useful for at least one air flow device 22 to have at least one air flow layer 2251. In this context, "layer" denotes not only contiguous surface areas but also arrangements of several individual formations provided they are arranged next to each other essentially in the same plane, for example a spacing layer that keeps at least two areas of the encasing device 224 apart in order to keep the space between the two areas permeable to air even during mechanical stress on the ventilation system 20, or a multitude of channels arranged next to each other. This will make it possible to guide air from one or several air intakes 121 to one or several air outlets 123.

Preferably, at least one air flow layer 2251 is at least partially on the A-side of the padding 5 in order to avoid a sealing of air passage channels 2222 by a user. Preferably, at least one air flow layer 2251 is designed at least partially with a layer thickness of between 5 and 50 mm, preferably between 8 and 15 mm. In this case, the material thickness of a surface or fiber material is preferably less than 2 mm, preferably less than 1 mm or even less than 0.5 mm.

It may be useful for at least one spacing, device 225 to have at least one spacer 2252. This denotes any component that serves to support an air-permeable free space 226 of a ventilation system 20, in particular of an air flow device 22. It may involve, for example, extrusion parts, for example made of foam material, or flat blocks, for example stamping parts of spacing fabric, cone-shaped castings, for example of foam material, or deep-drawn molded parts, for example nubs made of foil. This permits a flat arrangement of an air exchange device 221 and/or of an air flow device 22 parallel to a surface to be climatized and simultaneously a transfer of forces directed vertically thereto onto components lying underneath, for example paddings.

Preferably, the number of spacers 2252 will be selected in such a way that a uniform flat support and proper air permeability will be provided. This is understood to mean that in any arbitrarily chosen stretch of 70 mm along the air flow device 22, at least 20%, better 40%, are supported and at least 40%, better 60%, are air permeable.

If at least a part of the spacers 2252 are arranged flush to each other in one or several rows and preferably next to each other in the air flow layer 124 along one air flow direction, it will create a good support with low flow resistance.

If at least a part of the spacers 2252 are arranged immediately next to each other without any free space, it will create greater softness than a one-piece spacer of comparable size as the composition would have. If at least a part of the spacers 2252 are made of a material of a different type, for example different base materials or different texture, preferably arranged alternating with other, it will permit the formation of cost-effective area materials with high functionality, for example for spacing layers made of foam zones and spacing fabrics.

If at least one spacer 2252 has a preferably nub-shaped projection, for example with a conical, round, mushroom head-like and/or tuft-like contour and, for example, an elongated, cylindrical, ring or cuboid-shaped, round and/or zig-zag-shaped base area, it will facilitate a simple manufacture with good stability.

If at least one spacer 2252 has a height within a range of 3 to 40 mm, preferably 5 to 25 mm, preferably 10 to 18 mm, it will bring about low air flow resistance and require little installation space.

Preferably, at least one spacer 2252 is at least partially made of an elastic, flexible, soft, springy and/or supporting material, for example rubber, silicon, caoutchouc, hard foam, foam rubber, cellulose, textiles, paper and the like. This will provide it with a high padding effect and sufficient reset forces to keep the air flow device free.

If at least one spacer 2252 is at least partially made of a reticulated foam and has an air-permeable surface, it will bring about improved permeability of the air flow device 22.

Advantageously, at least one spacer 2252 may be connected with at least one spacing device 2253 in material-fitting fashion, in particular glued to it or formed out of it in one piece, for example through deep-drawing. This will bring about an easy handling during manufacture or respectively, a cost-effective manufacture.

Preferably, the distances between spacers designed as projections and/or nubs is the 0.5-fold to threefold of their own base breadth and/or of the breadth of their peak plateau, preferably one to twofold. It may be useful if the projections cover ⅓ to ¹⁄₁₀ of the base area of the spacing device 225. Preferably, the portion of the projections amounts to ⅛ to ½ of the base area of the spacing device 225.

Preferably, at least one spacing device 225 is at least partially equipped with a flat spacer carrier 2253 and spacers 2252 arranged on it. The spacers 2252 are preferably made, at least partially, of the material of the spacer carrier 2253, preferably by indentations, inversions or stampings, and are therefore preferably hollow.

Figure 8:
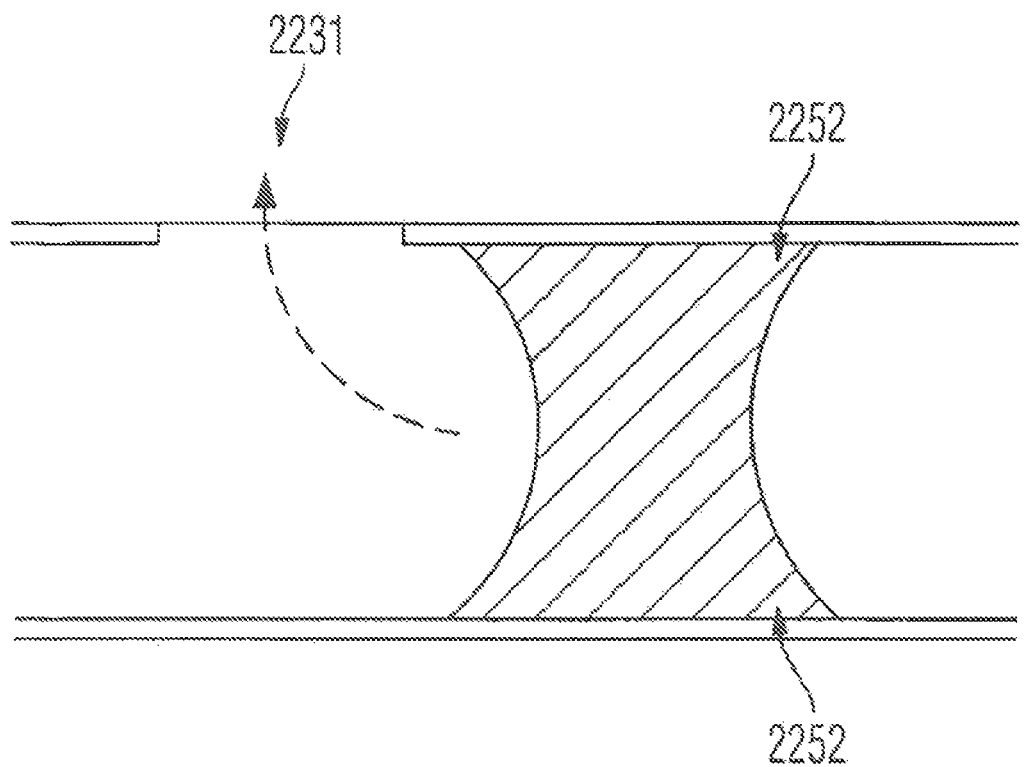
Figure 9:
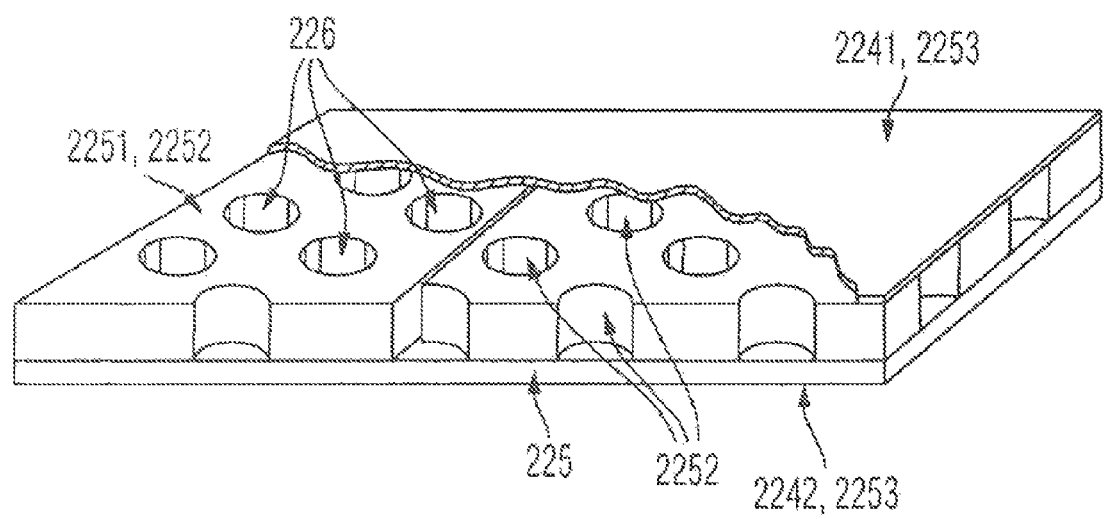

Preferably, at least one spacer 2252 (FIG. 8) has at least one middle section that is at a distance from a first and a second encasing section 2241 and 2242. Moreover, it has preferably a load distribution zone arranged on an encasing section 2241, 2242. It may be broader than the middle section, preferably at least in one direction along the spacing device 225. Preferably, the cross sectional surface of the load distribution zone is greater by at least 10% than that of the middle section, preferably greater by at least 30%, better yet by 50%.

Figure 7:
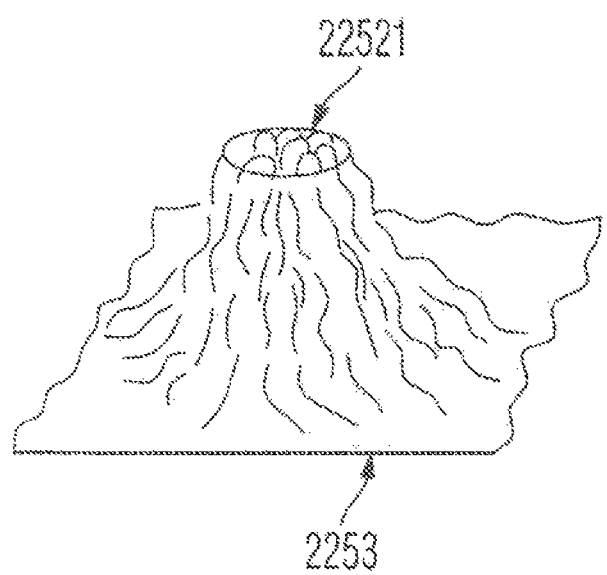
FIG. 7 Alternative embodiment of a nub-shaped spacer 2252 made of fiber-containing material FIG. 8 Third embodiment of a spacer 2252 with a waist profile in a longitudinal cut FIG. 9 Alternative embodiment of a ventilation device 20 with a plane spacing mechanism 225 having free spaces 226 and spacers 2252, in a perspective view and partial upright projection FIG. 10 Climate object 2 in the form of a seat with an air exchange mechanism 221 on the B-side of a padding 5 intended for sitting, and air passage channels 2222 to the A-side in a perspective cut, with a spacer carrier 2253 simultaneously serving as a second encasing segment 2242

It may be useful for at least one spacer 2252 to have at least one peak plateau 22521 (FIGS. 7+8), for example in the form of a flattening or rounding. This will permit a good force transfer and an enlarged attaching surface. Preferably, at least one spacer 2252 has rounded or beveled transitions from a lateral wall of the projection to a peak plateau 22521.

It may be useful for at least one spacer 2252 to have at least one load distribution zone 22522. This will permit a better redistribution of the load of surrounding areas to spacers 2252.

It may be useful for at least one spacing device 225 to have at least one spacer carrier 2253. This will permit an easy simultaneous installation of the spacers 2252. Preferably, their number is selected in such a way that one spacer carrier 2253 is provided for each air flow device 22. But one separate spacer carrier 2253 each may also be provided for at least one air exchange device 221 or at least one surface to be climatized.

If an air exchange device 221 as well as a connecting device 222 have a spacing device 225, such spacing devices 225 may be made as one piece and/or of the same materials and preferably have the same structure in order to simplify their manufacture.

But it may also involve spacing devices 225 that are different from each other in order to realize different properties of the air exchange device 221 and of the connecting device 222. For example, it may be provided to make the spacing device 225 of the air exchange device 221 of a compression-resistant synthetic foil and the spacing device 225 of the connecting device 222 of a spacing fabric or of a sequence of channel segments in order to make a flexible or bent connecting device 222 possible.

Preferably, at least one spacer carrier 2253 is formed at least partially in such a way that it forms a preferably contiguous surface fabric. Preferably, this form corresponds at least in sections at least essentially to a foil, a textile and/or a polymer foam layer. It may be useful for at least one spacer carrier 2253 to have a surface that is slightly smaller than a surface to be climatized or a base area of a spacing device 225. It may be equipped with spacers on a front side and/or on a rear side.

If at least one spacer carrier 2253 is at least partially made of a thermally activatable adhesive, for example on its surface, it will make it possible to attach spacers very easily to the spacer carrier 2253.

If at least one spacer carrier 2253 is at least partially rigid, for example made of polyester, polyamide, polypropylene or a similar material, such an arrangement may be arranged on the B-side of a vehicle seat under a padding 5 equipped with vertical passage channels 2222.

If at least one spacing carrier 2253 is at least partially arranged in such to way that it runs at least partially along an encasing device 224, it will bring about low flow resistance. If at least one spacing carrier 2253 is at least partially arranged in such is way that it runs at least partially between a foam padding 5 and the spacers 2252 carried by it, it will be able to prevent an infiltration of padding foam into the spacers and simultaneously serve as a carrier of injection nozzles or blowing-out openings towards the padding.

If at least one spacing carrier 2253 is at least partially arranged in such a way that the spacers 2252 carried by it are at least partially positioned between a foam padding 5 and the spacer carrier 2253, it can simultaneously seal a ventilation 51 in the foam of the padding 5 at least partially.

Figure 11:
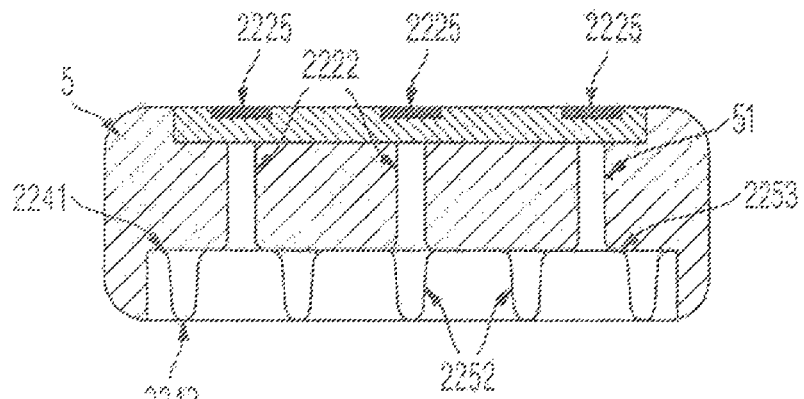
FIG. 11 Longitudinal cut through a padding 5 with spacer carrier on the B-side, with the spacer carrier 2253 being arranged between padding 5 and spacers 2252; having connection openings for channels in the foam of the padding 5; and the air passage channels 2222 being covered locally on the A-side by a deflecting device 2225
Figure 12:
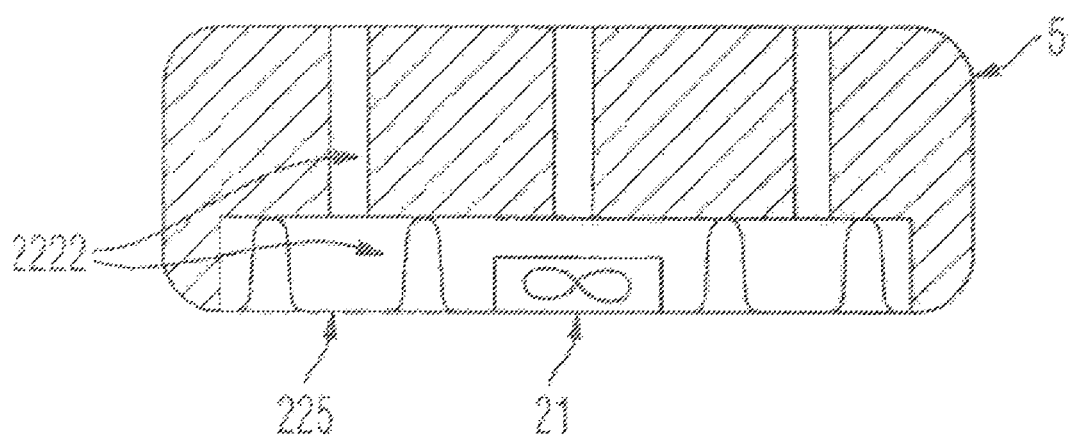
FIG. 12 Cut through a seat padding 5 with a ventilator integrated into a spacing mechanism 225
Figure 13:
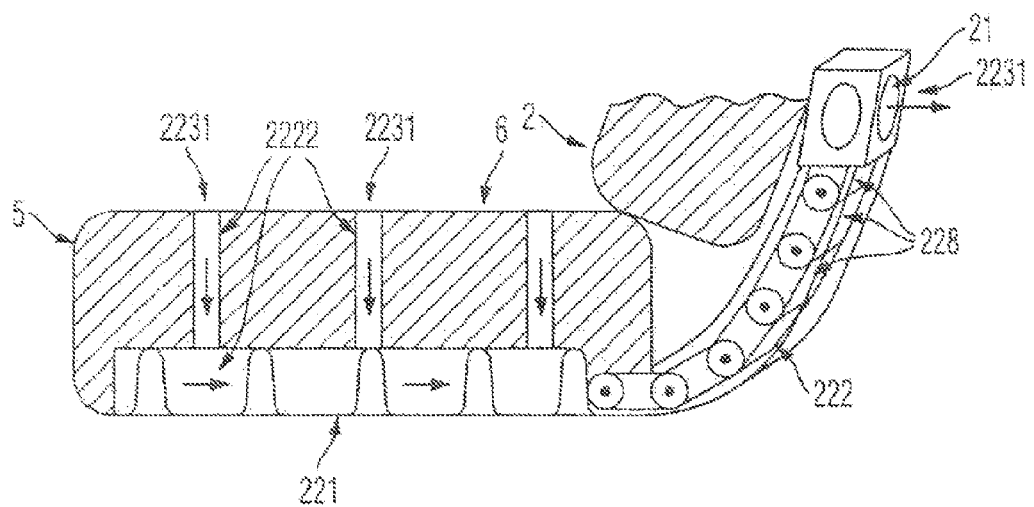
FIG. 13 Longitudinal cut through an air-conditioned padding 5 with a connecting device 222 to the air feed device 21, with a multitude of hollow channel segments 228 engaging with each other in chain-like fashion FIG. 14 Cross section of a climatized seat padding 5 with a multitude of channel branches 227 formed by hoses FIG. 15 Top view of the padding 5 intended for sitting of FIG. 14 with a multitude of approximately parallel running channel branches 227
Figure 14:
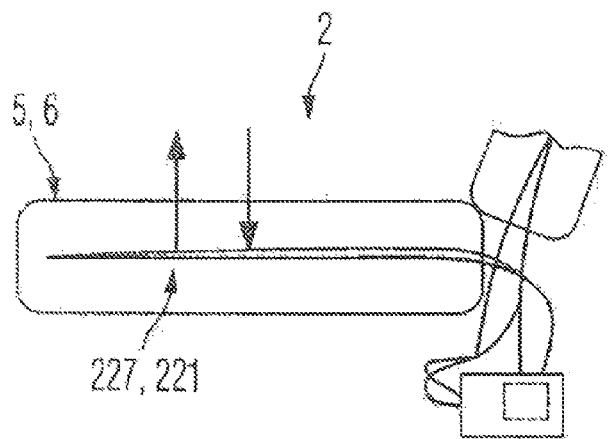
Figure 15:
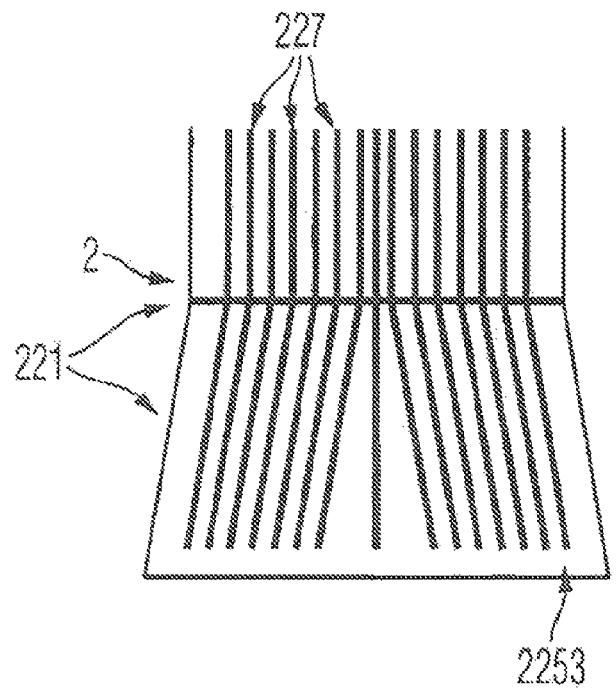
Figure 16:
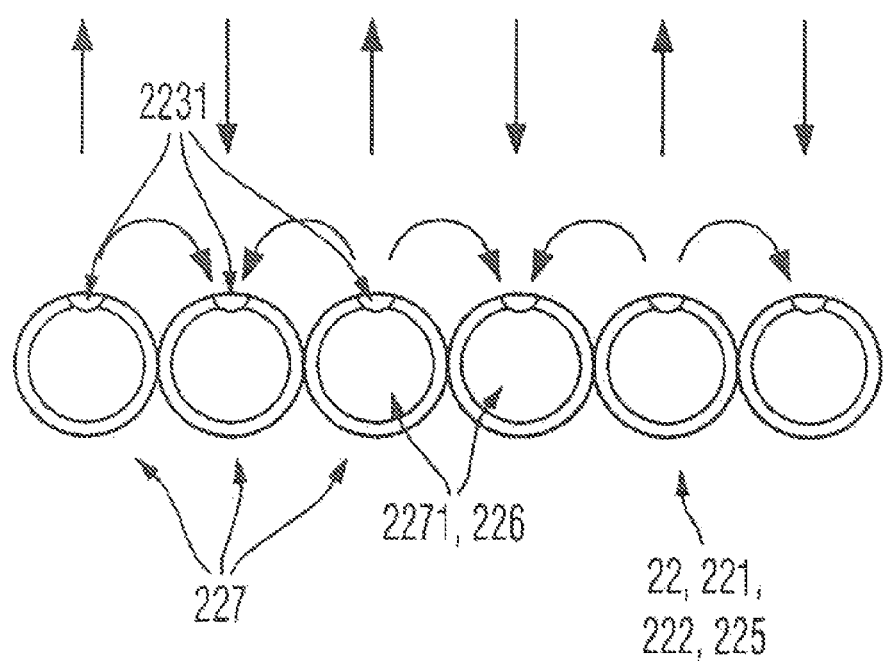
FIG. 16 Cross section through the channel branches 227 of FIG. 15 with air passage openings 2231 and depiction of a combined blow and suction operation modus FIG. 17 Perspective view of a ventilation device 20 with a multitude of channel segments 228 of channel branches 227 with short pieces of hose arranged in a row as well as next to each other FIG. 18 Enlargement of a series of hose sections of FIG. 17 with connecting bars 222 between the hose pieces in a perspective view FIG. 19 Section of a ventilation device 20 with a multitude of segmented channel branches 227 held in place on their upper side and bottom side by textile spacers 2253

If at least one spacing carrier at least partially formed of sections of an encasing device 224 (FIGS. 11-13), for example as a deep-dawn nub foil made of polymer material, it will bring about a saving of material.

Figure 4:
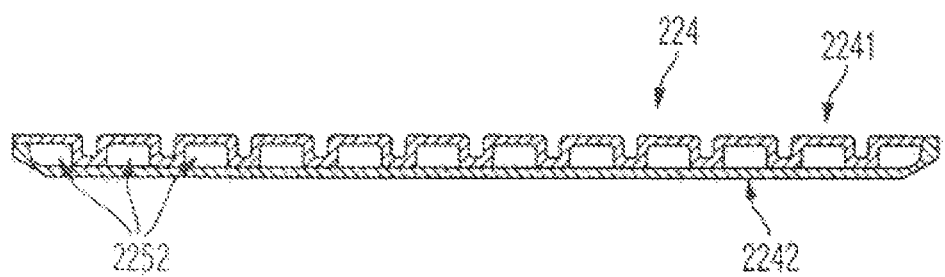
Figure 5:
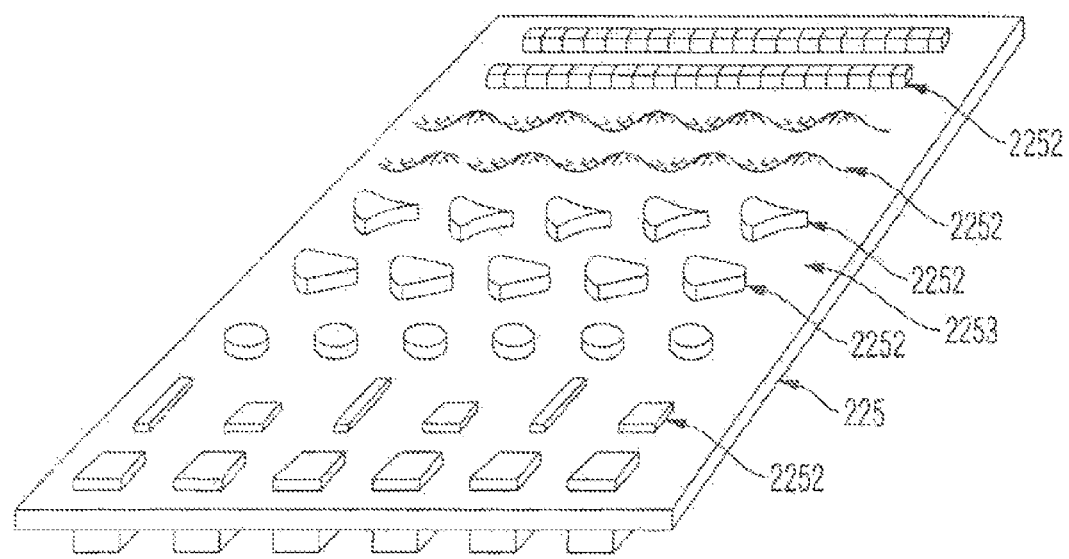
Figure 6:
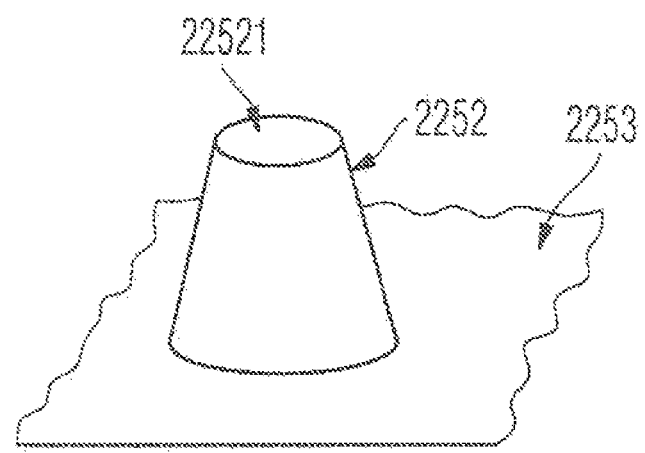

An encasing device 224 and/or a spacing device 225 (for example nub foil) may also be made, at least partially, of an elastic material, for example rubber, silicon or caoutchouc. Such a spacing device 225 could be arranged, for example, on the A-side, preferably directly underneath a cover 6 of a surface to be climatized. Preferably, at least one such spacing device 225 is provided with at least one covering device (FIGS. 4+5). The cover device may, for example, be a fleece that may be fixed on the edges of the spacing device 225 (for example nub foil) and/or on at least some of the spacers (nub peaks). The fixing may preferably be done by means of an adhesive, ultrasound welding or vulcanization.

The cover device may also be a second spacing device 225 (e.g. nubbed foil). The latter may be arranged on and/or attached to the spacing device 225, preferably in mirror inverted fashion, so that the peaks 22521 of the spacers 2252 will lie on top of each other. Such an arrangement results in an air flow device 22 that may be easy to manufacture and compression resistant. The cover device may be made, at least partially, of the same material as the first spacing device 225. However, it may also be made, at least partially, of another material. This would facilitate a combination of a soft and/or pull resistant cover device (e.g. a fleece) with a compression resistant spacing device (e.g. a nubbed foil).

In a particular embodiment, a first and second encasing section 2241+2242 (e.g. made of nubbed foil) could also be manufactured as one piece together with its cover device, for example by means of a spray cast process with a liquid polymer and/or elastomer casting material. The cover device is attached to at least 70% of all spacers 2252, preferably in undisplaceable fashion, for example by means of gluing. This will prevent unduly deep constrictions of padding material and/or of material of the cover device between the spacers 2252. The same protective effect will result in the event that the spacing device 225 is bent in such a way that the peaks of the spacers 2252 approach each other.

Preferably, at least one spacing device 225 and at least one cover device will not be fixed to each other at least in a part of their spacers 2252 so that the cover device will be displaceable at least on a part of the nub peaks relative to the peaks of the respective spacers 2252. This may be useful if an air flow device 22 is to be bent in such a way that the peaks of the spacers 2252 distance themselves from each other.

It may be useful for at least one air flow layer 2251 to have at least one free space 226 in order to be able to guide air between spacers 2252 and/or through the latter by means of the air flow layer 2251.

It may be useful for at least one air flow device 22 to have at least one channel branch 227. This denotes a preferably elongated component or component section with a branch hollow 2271 permeable to air in the flow direction and a branch wall 2272 delimiting the hollow at least partially along the air flow. Such channel branches 227 may be, for example, hose-like or shaft-like sections arranged with their longitudinal axis in the direction of an air flow. This will make it possible to guide air systematically with as little loss as possible and to simultaneously maintain the pressure resistance of the ventilation system as much as possible.

Figure 17:
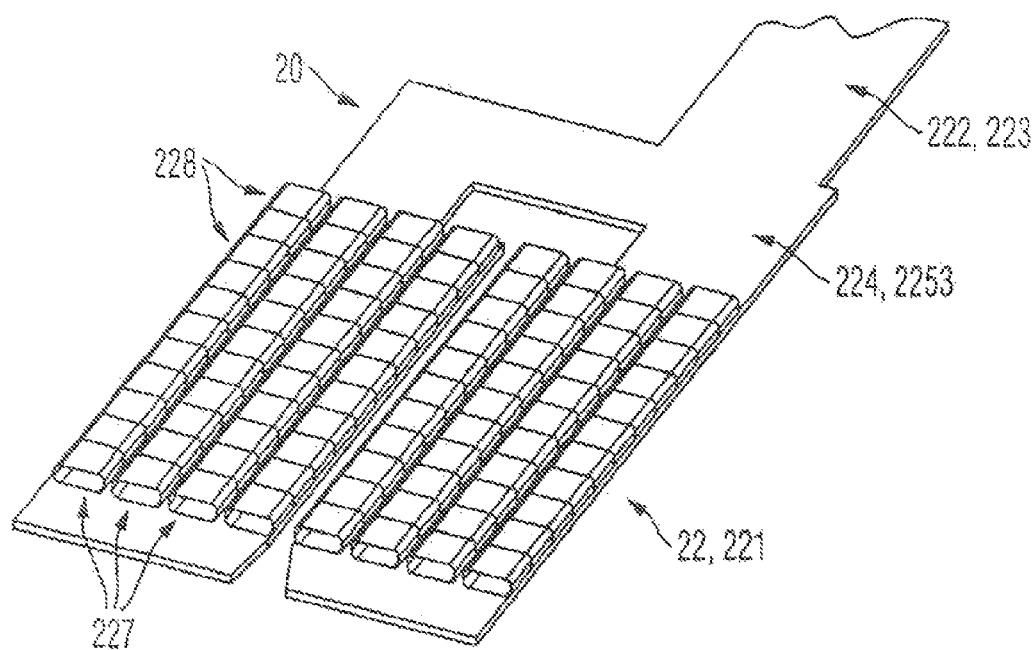

Preferably, at least two channel branches 227 of at least one air flow device 22 and/or of at least one air exchange device 221 are arranged in one plane next to each other, for example in an air exchange device 221 between a padding 5 and a surface to be climatized in order to achieve a large-area air exchange. It may be useful if their number is within a range of 2-40, preferably 2-10, pieces in an air flow device 22. Preferably, a multitude of short channel branches 227 are arranged next to each other and behind an additional multitude of short channel branches 227 or channel branch sections relative to the main air flow (FIG. 17). Such an embodiment will permit a good distribution of the air in longitudinal and transverse directions even if some zones should be greatly compressed due to a local pressure load.

Preferably, at least two channel branches 227 are arranged at least partially and preferably essentially next to each other in an air exchange device 221 and/or a connecting device 222 of the air flow device 22, preferably parallel to each other in certain sections. Preferably, at least two channel branches 227 are at least partially arranged essentially in the same direction as an air flow moving through the air flow device 22. Preferably, at least two channel branches 227 are at least partially arranged essentially in a plane that is arranged essentially parallel to the running direction of the air flow device 22 and/or of the air exchange device 221 and/or of the surface to be climatized.

Figure 18:
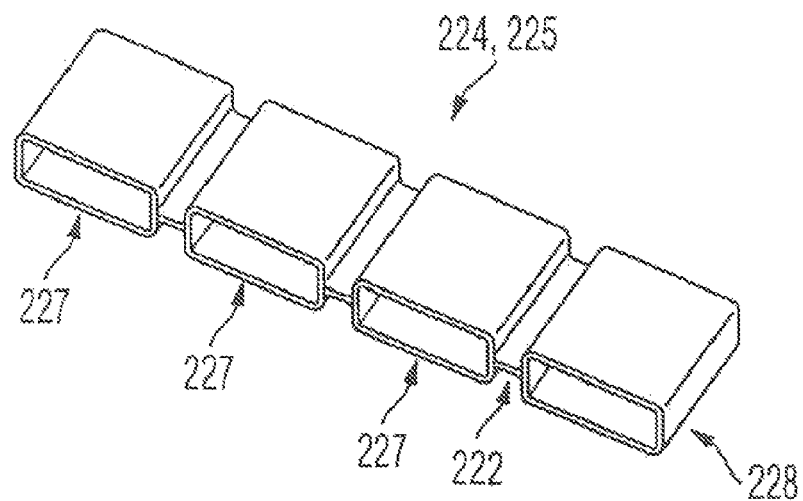
Figure 19:
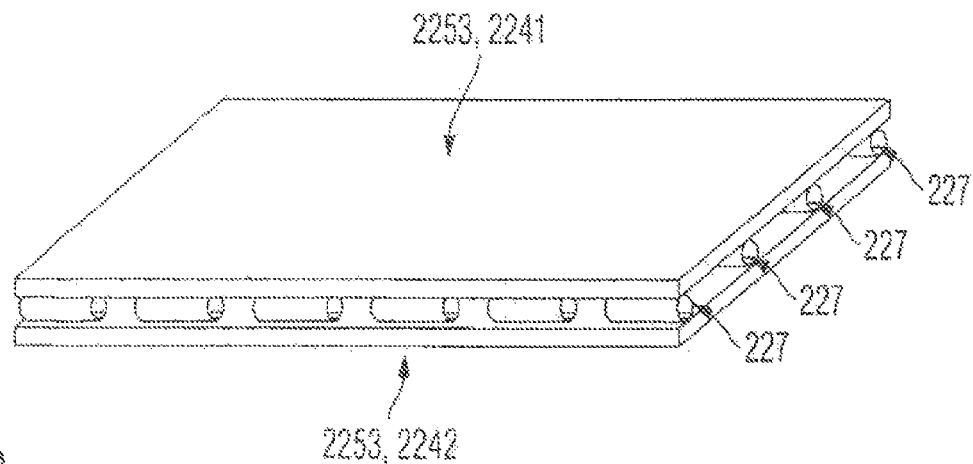
Figure 20:
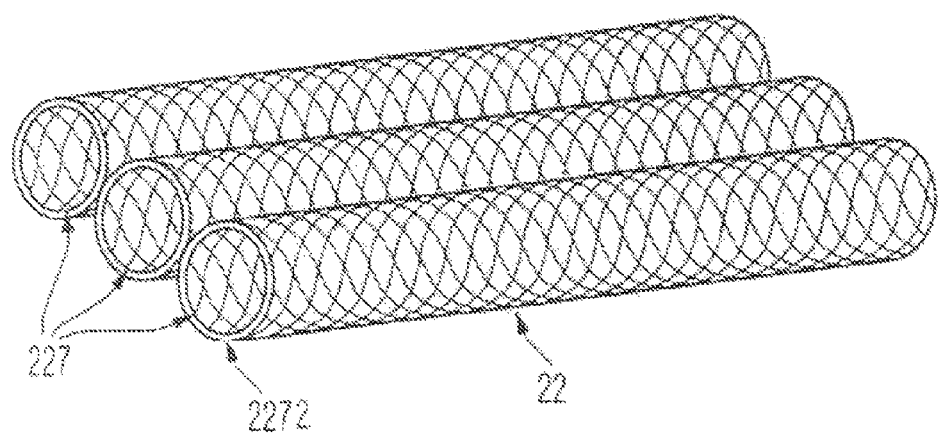
FIG. 20 Perspective view of several channel branches 227 arranged next to each other in the form of netting hoses FIG. 21 Cut through a ventilation device 20 with a first and a second casing segment 2241 and 2242 and with bridges to form several channel branches 227, here made of textile material, in a perspective cut presentation FIG. 22 Perspective view of a few channel segments 228 with support bars and channel branches resulting therefrom FIG. 23 Perspective view of a padding 5 intended for sitting whose surface to be climatized is supplied with air through a chain of channel segments 228 that runs from the B-side around to padding side to the A-side; that runs on the A-side at a right angle to the anchoring trench 54 of an anchoring device; and that has an air exchange device 221 on the A-side that covers the chain of channel segments 228 and that protrudes on both sides

If at least two channel branches 227 arranged adjacent to each other are arranged at least partially in such a way that sections of their walls aligned with each other are also at least partially distanced from the respective other channel branch (for example by bars of foam located in between), it will bring about a better support by a great number of support walls in the channel. Preferably, at least two channel branches 227 are at least partially connected with each other, for example in material-fitting fashion by means of cast connecting bars (FIG. 18). This may make the installation easier.

Figure 21:
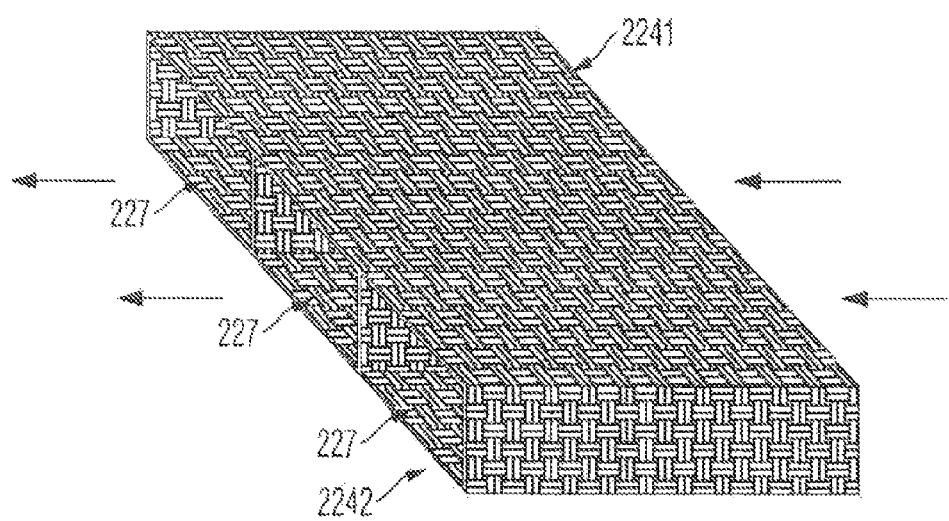
Figure 22:
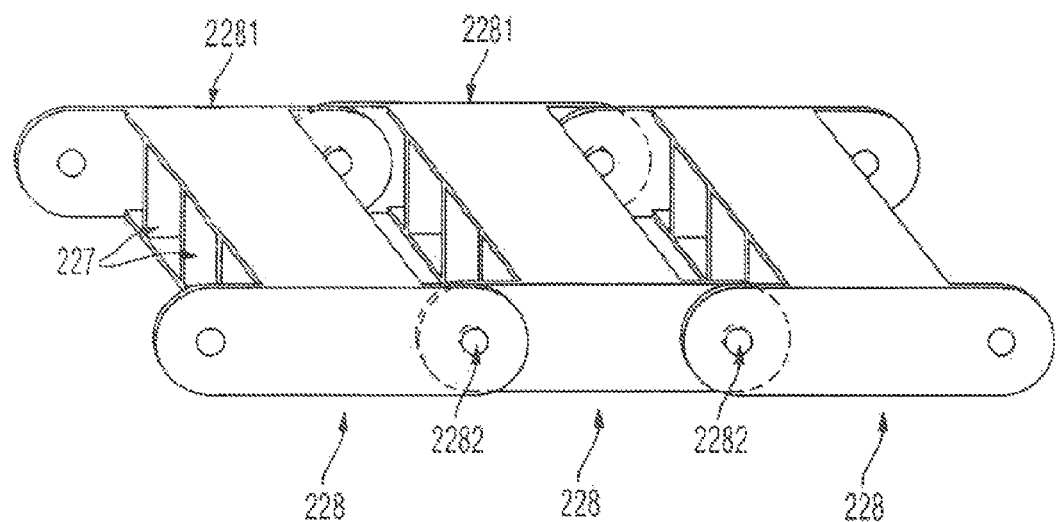
Figure 23:
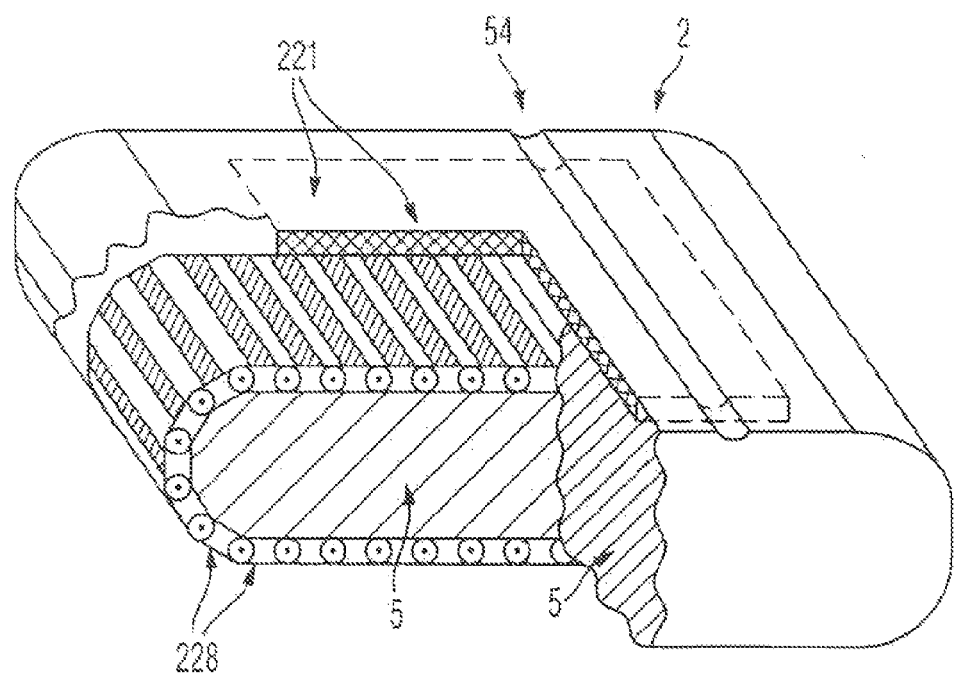

If at least two channel branches 227 arranged adjacent to each other share at least parts of a common wall (FIGS. 21+22), it will bring about high permeability to air by means of a low cross sectional cover of the bearing structures in the air channel. Preferably, at least one air flow device 22 is designed as a mat-like, largely hollow component in which a multitude of support bars are arranged between a first encasing segment 2241 and a second encasing segment 2242 essentially arranged parallel thereto along an air flow direction in order to form at least two channel branches 227.

Preferably, at least one channel branch 227 and/or its branch hollow space 2271 has essentially a circular or square cross section, at least in a partial segment. Its interior diameter preferably lies within a range of 5 to 12 mm. Rectangular branches should have an interior hollow space of approximately 8 mm in height. Exterior diameters for channel branches 227 lie within a range of 8-15 mm. The exterior height of the hollow space of rectangular channel branches 227 lies within a range of 8-15 mm.

Preferably, at least one branch hollow space 2271 is exposed to an air flow directed at an air movement mechanism 21. Preferably, at least one (in particular different) branch hollow space 2271 is exposed to an air flow directed away from an air movement mechanism 21. Preferably, at least two branch hollow spaces 2271 are connected to connectors of an air movement mechanism 21 that are different from each other and/or to air movement mechanisms 21 that are different from each other. In this context, preferably at least two branch hollow spaces 2271 are arranged essentially parallel to each other in order to achieve an effective dehumidification of a surface to be climatized by means of a simultaneous feed of climatized air and the removal of undesired air.

Preferably, at least one branch wall 2272 is at least partially made of a soft, elastic and/or flexible material, for example rubber, silicon, PVC, polyethylene, polyurethane or similar. This will permit its use in the area of an air exchange device 221 and/or close to a surface to be climatized.

Preferably, at least one branch wall 2272 is at least partially made of a pressure-resistant material, for example hard PVC, polyacryl, polyurethane or similar. This will permit an increase of their pressure resistance in the area of a connecting device 222 of an air movement mechanism 22 and/or at a distance from a surface to be climatized.

Preferably, at least one branch wall 2272 is at least partially made of a textile material, for example of a weave, fabric, knit or mesh. This will permit high flexibility with low weight. Preferably, at least one branch wall 2272 is at least partially made of a textile material that is mounted in more than two dimensions, for example fabrics and weaves. This will permit the production of a tridimensionally formed branch wall 2272 in one single operation.

Preferably, at least one branch wall 2272 is at least partially made of a textile material with at least partially thermoplastic fibers and/or threads, for example of polyester, polyamide and/or polypropylene. This will permit the production of a stiffened component by shrinking the thermoplastic components by means of thermal pressurization. This will make it possible to make a pressure-resistant material with great resilience from textile materials as well.

Preferably, at least one branch wall 2272 is at least partially made of fibers and/or threads that extend essentially parallel to the extension direction of the channel branch 227. This creates great tensile strength of the channel branch 227. Preferably, at least one branch wall 2272 is at least partially made of fibers and/or threads that extend essentially along the circumference of a cross section of the channel branch 227 and/or essentially vertical to the extension direction of the channel branch 227. This creates great tensile strength of the channel branch 227. Preferably, at least one branch wall 2272 is at least partially made of fibers and/or threads that essentially run around the channel branch 227 in spiral fashion. This creates great flexibility of the channel branch 227. Preferably, at least one branch wall 2272 is at least partially made of two different types of fibers and/or threads, for example elastic and non-elastic fibers or threads of various thicknesses. This will permit a local adaptation of resistance properties and/or various properties of a channel branch 227 in longitudinal and circumferential direction.

Preferably, at least one branch will 2272 has at least one thread with a thickness within a range of 0.05-1 mm. For weft threads, a range from 0.1 to 0.5 mm may be particularly suitable in this respect. For chaining threads, a range from 0.4 to 0.5 mm may be particularly suitable in this respect.

Preferably, at least one branch wall 2272 has a thread thickness of 5-20 threads/cm in at least one direction. For weft threads, a range from 12-15 threads/cm may be particularly suitable in that respect. For chaining threads, a range from 11-13 threads/cm may be particularly suitable in that respect. Preferably, at least two channel branches 227 share at least some common fibers and/or threads. This could, for example, involve those that run essentially parallel to the channel branches in a common branch wall 2272 or those that are aligned at a right angle to the channel branch direction and that connect several channel branches 227 in bridge-like fashion or those that wind around one or several channel branches 227 in helical or snake-like fashion or that are intertwined with each other at a common hem. This will create a secure arrangement of the channel branches 227 next to each other without intersecting.

Preferably, at least one thread that runs at least partially on a first branch on a first side of an air movement device 22 also runs at least partially on a second branch of a side of an additional branch located opposite an air movement device 22.

Preferably, at least two channel branches 227 have fibers and/or threads of at least one weave, of at least one mesh and/or at least one fabric in common whose weft or chaining threads are arranged essentially parallel to the longitudinal direction of the channel branches 227 in a section of a common wall. Preferably, at least two channel branches 227 have fibers and/or threads of at least one weave, of at least one mesh and/or at least one fabric in common whose weft or chaining threads are arranged essentially vertical to the longitudinal direction of the channel branches. Both will bring about a saving of material.

Preferably, at least two channel branches 227 have fibers and/or threads of at least one weave, of at lest one mesh and/or at least one fabric in common whose weft or chaining threads are arranged at an angle to the longitudinal direction of the channel branches 227. This will prevent the channel branches 227 from snapping when being bent, thereby blocking the hollow space of the channel branches 227. If at least one thread is common to at least two channel branches 227, and if it is at least partially made of an elastic material and/or if it is not stuck or fused to other threads, it will bring about the same effect.

It may be useful for at least one channel branch 227 to have at least one branch cover layer, for example a laminated or encasing foil, in order to seal a channel branch 227 at least partially in airtight fashion. Preferably, at least one branch cover layer is made at least partially of a thermoplastic material, for example of a fleece with a portion of 10-20% thermoplastic fibers.

It may be useful for at least one air movement mechanism 22 to have at least one segmented air passage channel 2222 with at least one channel segment 228. "Segment" denotes a definable structural component or a definable section of a component that is relatively movable relative to any structural components or sections located in front or behind it. This is understood in particular to mean that the segment is displaceable and/or tiltable, pivotable or bendable in longitudinal and/or transversal direction thereto. This may be realized, for example, by a series of spacers arranged next to each other that are tiltable at their base on a spacer bearing them, relative to an adjacent series of spacers in front or behind it. Another example is a shaft-like frame that is pivotable relative to another frame arranged relative thereto in flush and articulated fashion. If a multitude of channel segments are provided that are arranged in a row relative to the air flow direction, curved channels can be constructed.

Preferably, at least one channel segment 228 has at least partially a cross sectional shape that is round or rectangular. It may be useful for at least one channel segment 228 to have a length that makes sufficiently tight radii of curvature of the segmented air passage channel possible 2222 so as to nestle along a padding contour. The length of a channel segment 228 lies advantageously within a range of 2 to 15 cm, preferably 3 to 8 cm. It may be advantageous for at least one channel segment 228 to have a breadth that essentially corresponds to the breadth and/or to the height of an encasing device 224. It may be advantageous if the value lies within a range of 0.5 to 50 cm, preferably 1 to 12 cm. It may be useful for at least one channel segment 228 to have a diameter and/or a height that essentially corresponds to the height of an encasing device 224. It may be advantageous if the value lies within a range of 5 to 15 cm.

Preferably, at least one channel segment 228 is at least partially composed of the same materials as at least one of the channel branches based on the same considerations.

Preferably, at least two channel segments 228 arranged adjacent to each other are not connected with each other, but both are attached to at least one side of an encasing device 224. This will make easy installation and the use of simple components possible, Preferably, at least two channel segments 228 arranged adjacent to each other are attached to each other. In this context, preferably not more than one of them is attached to an encasing device 224. This will permit greater mobility of the channel segments 228 within the encasing device 224.

If at least one channel segment 228 is at least partially arranged in such a way that a gap remains relative to a channel segment 228 arranged upstream or downstream relative to an air flow direction, it will permit adequate room for tilting movements and adequate transversal passage space for an exchange or air between channel branches 227 arranged next to each other. It may be useful if at least one gap with a breadth of 0.2 to 4 cm, preferably 0.5 to 1.5 cm, is provided between two channel, segments 228.

Advantageously, at least one channel segment 228 may be partially enveloped by an encasing device 224.

It may be useful for at least one channel segment 228 to have at least one segment frame 2281, "Frame" denotes a component that braces at least two sides of a hollow space cross section against each other at a right angle to the flow direction.

Preferably, at least one segment frame 2281 is at least partially designed as a shaft with a rectangular cross section or as a tube with a round cross section. It may be useful for at least one segment frame 2281 to be dimensioned in such a way that it will keep the entire cross section of a channel branch 227 and/or of an air movement mechanism 22 free. If its number is chosen in such a way that several segment frames 2281 will be arranged next to each other in a cross sectional plane of an air movement mechanism the cross section of an air movement mechanism 22 will be more pressure resistant due to a greater number of transversal bars.

Preferably, at least one segment frame 2281 is at least partially made of a stiff material, for example a synthetic.

It may be useful for at least one channel segment 228 to have at least one segment articulation 2282. At least one segment articulation 2282 may be realized for example by nubs provided on the segment articulation 2282 or, respectively, by recesses fitting the nubs. In that case, the rotational axis of the segment articulation 2282 will preferably be at a distance from the external edges of a segment frame 2281. The rotational axis of at least one segment articulation 2282 may also be located on external edges of a segment frame 2281 or between adjacent channel segments 228, for example if several channel segments 228 are arranged flush with each other on a flexible carrier for example on the encasing device 224 or on the spacing carrier 2253) and are realized by material section segment articulations 2282 located between the channel segments. This will make it possible to swing or, respectively, to bend the channel segment 228 relative to channel sections in front of or behind the channel segment 228 and to better realize curved channels or channel sections.

Figure 10:
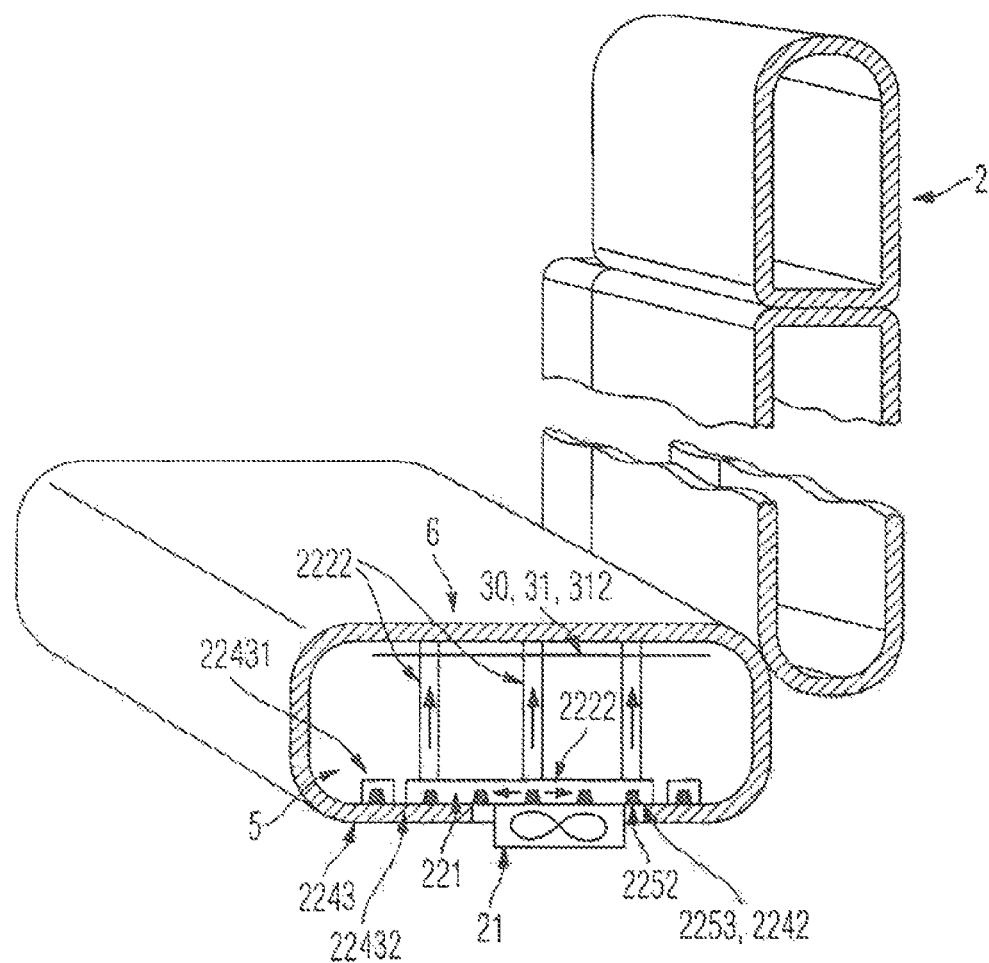

It may be useful for at least one climatization device 10 to have at least one temperature control device 30 (FIG. 10). This denotes any device that can be used for a systematic changing of the ambient temperature, as, for example, all devices with at least, one electric, heating resistor, a textile area heating element, a heat pump, a Peltier element and/or air movement mechanism such as, for example, a ventilator.

It may be useful for at least one temperature control device 30 to have at least one heating device 31, such as, for example, a flexible area heating element that [is made] at least partially of a textile material. It may, for example, be integrated in the padding 5 of a climate object 2, for example of a seat.

It may be useful for at least one heating device 31 to have at least one Ohm heating resistor, for example in the form of a heating section. Preferably, a heating device 31 has a multitude of heating resistors that are arranged preferably next to each other in meandering fashion and electrically parallel to each other, for example at a mean distance of approximately 2 cm from the respective next resistor(s) and approximately parallel thereto. Preferably, at least one heating resistor is arranged at least partially on a heating resistor carrier 312, for example partially or with its full area, for example by means of an adhesive.

It may be useful for at least one temperature control device 30 to have at least one heating resistor carrier 312. Preferably, at least one heating resistor carrier 312 is at least partially a flat structure. Preferably, at least one heating resistor carrier 312 is at least partially made of a textile, mesh, knit, weave, fleece, flexible thermoplasts, air-permeable material, a stamped or nubbed foil, or formed by the object 2 to be climatized and/or at least partially by a part of the latter's surface.

It may be useful for at least one temperature control device 30 to have at least one electrode in order to feed current into at least one heating section.

It may be useful for at least one temperature device 30 to have at least one cooling device.

What is claimed is:

1. A ventilation system for a climatizable seat comprising:
   at least one flat air flow device including:
      an air exchange device;
      a spacing device including:
         i) a spacer carrier, and
         ii) a plurality of spacers distributed across the spacer carrier and extending from the spacer carrier for keeping an air passage of the ventilation system open;
   one or more air movement mechanisms; and
   one or more connecting devices connecting the at least one flat air flow device and the one or more air movement mechanisms;
   wherein the spacer carrier is at least partially made of a foil;
   wherein the plurality of spacers are nub-shaped projections that provide compressive strength to the spacing device; and
   wherein the at least one flat air flow device is adapted to be located on a B-side below padding of the climatizable seat.

2. The ventilation system of claim 1, wherein the one or more connecting devices includes two or more channel segments that are arranged in a row relative to an air flow guided through the at least one flat air flow device, and wherein the two or more channel segments are movable, relative to each other; and wherein the two or more channel segments are arranged adjacent to each other and are attached to each other.

3. The ventilation system of claim 2, wherein the two or more channel segments are attached to each other at one or more pivot points and engage with each other in chain-like fashion.

4. The ventilation system of claim 1, wherein the ventilation system includes at least one channel segment, and wherein the at least one channel segment has at least one segment frame, wherein the segment frame braces at least two sides of a hollow space cross section.

5. The ventilation system of claim 4, wherein the at least one segment frame is a shaft-like frame that is pivotable relative to another segment frame arranged relative thereto in flush and articulated fashion.

6. The ventilation system of claim 1, wherein the ventilation system includes at least one channel segment, and wherein the at least one channel segment has at least one segment articulation, which is realized by projections provided on the segment articulation or by recesses fitting the projections.

7. The ventilation system of claim 6, wherein the at least one segment articulation allows one channel segment to bend relative to adjacent channel segments.

8. The ventilation systems 7, wherein the at least one segment articulation has a rotational axis located at a distance from an external edge of the at least one segment frame.

9. The ventilation system of claim 1, wherein the spacing device is at least partially attached to an encasing device, and the encasing device is at least partly made of a foil impermeable to air.

10. The ventilation system of claim 9, wherein the foil of the encasing device, the spacer carrier, or both, is made of polyethylene terephthalate, polyamide, polypropylene, polyurethane, or combination thereof.

11. The ventilation system of claim 2, wherein the two or more channel segments are at least partially arranged so that a gap remains between the two or more channel segments relative to an air flow direction.

12. A climatizable seat comprising:
    a ventilation system comprising:
       at least one flat air flow device including:
          an air exchange device;
          a spacing device including:
             i) a spacer carrier, and
             ii) a plurality of spacers extending from the spacer carrier for keeping an air passage of the ventilation system open; and
       an air movement mechanism:
          wherein the at least one flat air flow device is connected to the air movement mechanism,
          wherein the spacing device is marginally compressible so that during normal operating loads, the spacing device is reducible in its thickness by 50 percent or less;
          wherein the spacer carrier is at least partially made of a foil;
          wherein the plurality of spacers are nub-shaped projections that provide compressive strength to the spacing device;
          wherein the nub-shaped projections have height of about 3 mm to about 25 mm measured from the spacer carrier to a highest point of each nub-shaped projection;
          wherein the plurality of spacers are arranged on the spacer carrier to create one or more flow paths to guide air flow into one or more directions; and
          wherein the at least one flat air flow device is located on B-side below padding of the climatizable seat.

13. The ventilation system of claim 1, wherein the plurality of spacers cover about 10 percent to about 33 percent of a base area of the spacing device.

14. The ventilation system of claim 1, wherein the spacing device is at least partially flexible to follow one or more bends of the at least one flat air flow device.

15. The ventilation system of claim 1, wherein one or more spacers are at least partially made of an elastic supporting material, and wherein the elastic supporting material is a foam, rubber, or a combination thereof.

16. The ventilation system of claim 1, wherein one or more of the plurality of spacers are at least partially made of the material of the spacer carrier.

17. The ventilation system of claim 16, wherein the one or more of the plurality of spacers are integrally formed with the spacer carrier.

18. The ventilation system of claim 9, wherein the encasing device includes a sealing device that encases at least a portion of the spacing device to reduce escaping of air from the at least one flat air flow device.

19. The climatizable seat of claim 12, wherein a distance between spacers along one or more main air flow directions is smaller than a distance between spacers arranged transversally to the one or more main air flow directions.

20. The climatizable seat of claim 12, wherein an area of the spacing device and/or plurality of spacers is at least partially removed to create a space for connection to the one or more air movement mechanisms.

\* \* \* \* \*